United States Patent
Seyama et al.

(10) Patent No.: US 9,294,959 B2
(45) Date of Patent: Mar. 22, 2016

(54) RADIO COMMUNICATION SYSTEM, MOBILE STATION APPARATUS, BASE STATION APPARATUS, AND RADIO COMMUNICATION METHOD IN RADIO COMMUNICATION SYSTEM

(75) Inventors: Takashi Seyama, Kawasaki (JP);
Takashi Dateki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 871 days.

(21) Appl. No.: 13/235,559

(22) Filed: Sep. 19, 2011

(65) Prior Publication Data
US 2012/0002657 A1    Jan. 5, 2012

Related U.S. Application Data

(63) Continuation of application No. PCT/JP2009/001326, filed on Mar. 25, 2009.

(51) Int. Cl.
H04W 4/00 (2009.01)
H04W 28/10 (2009.01)
H04L 1/00 (2006.01)
H04L 1/18 (2006.01)
(Continued)

(52) U.S. Cl.
CPC ............. *H04W 28/10* (2013.01); *H04L 1/0006* (2013.01); *H04L 1/1628* (2013.01); *H04L 1/1854* (2013.01); *H04L 1/1861* (2013.01); H04L 1/1896 (2013.01); H04L 5/0055 (2013.01); H04W 28/22 (2013.01)

(58) Field of Classification Search
None
See application file for complete search history.

(56) References Cited

U.S. PATENT DOCUMENTS 6,367,045 B1   4/2002   Khan et al.
7,227,851 B1 * 6/2007   Gopalakrishnan .... H04L 1/0025
                                                370/335
(Continued)

FOREIGN PATENT DOCUMENTS

JP    2002-359882    12/2002
JP    2003-8553      1/2003
(Continued)

OTHER PUBLICATIONS

3GPP TS 36.211 V8.3.0; 3rd Generation Partnership Project; Technical Specification Group Radio Access Network; Evolved Universal Terrestrial Radio Access (E-UTRA); Physical Channels and Modulation (Release 8); Dated May 1, 2008.
(Continued)

*Primary Examiner* — Michael J Moore, Jr.
(74) *Attorney, Agent, or Firm* — Myers Wolin, LLC

(57) ABSTRACT

A radio communication system including a base station and a mobile station, which perform radio communication. The mobile station includes: a receiver which receives a data signal transmitted from the base station; a controller which switches a number of group units and groups the data signal by the switched number of group units, according to one parameter or a combination of a plurality of parameters out of a type of a channel, a type of modulation scheme and encoding rate, an assigned resource amount, or a number of transmitting antennas of the mobile station, when an ACK signal or an NACK signal in response to the data signal is transmitted; and a transmitter which transmits the ACK signal or NACK signal in each group unit of the data signal. The base station includes: a transmitter which transmits the data signal; and a receiver which receives the ACK or NACK signals.

10 Claims, 19 Drawing Sheets

(51) Int. Cl.
*H04L 1/16* (2006.01)
*H04W 28/22* (2009.01)
*H04L 5/00* (2006.01)

(56) References Cited

U.S. PATENT DOCUMENTS

| | | | |
|---|---|---|---|
| 7,346,037 B2 | 3/2008 | Yun et al. | |
| 7,392,460 B2 * | 6/2008 | Kim et al. | 714/781 |
| 8,266,513 B2 * | 9/2012 | Kim | H04L 1/0065 714/758 |
| 8,284,732 B2 * | 10/2012 | Nimbalker et al. | 370/330 |
| 8,625,554 B2 * | 1/2014 | Zhang et al. | 370/338 |
| 9,032,267 B2 * | 5/2015 | Shimanuki et al. | 714/751 |
| 2002/0196812 A1 | 12/2002 | Yamaguchi et al. | |
| 2003/0081692 A1 * | 5/2003 | Kwan et al. | 375/295 |
| 2003/0236071 A1 | 12/2003 | Ito | |
| 2005/0195849 A1 | 9/2005 | Rajkotia et al. | |
| 2005/0249163 A1 * | 11/2005 | Kim et al. | 370/335 |
| 2008/0225965 A1 * | 9/2008 | Pi | H04L 1/0003 375/260 |
| 2008/0253318 A1 * | 10/2008 | Malladi et al. | 370/328 |
| 2009/0028129 A1 * | 1/2009 | Pi et al. | 370/351 |
| 2009/0077447 A1 * | 3/2009 | Buckley | H03M 13/09 714/757 |
| 2009/0097466 A1 * | 4/2009 | Lee et al. | 370/344 |
| 2009/0219870 A1 * | 9/2009 | Wengerter et al. | 370/329 |
| 2009/0238066 A1 * | 9/2009 | Cheng | 370/216 |
| 2009/0296644 A1 * | 12/2009 | Cheon et al. | 370/329 |
| 2009/0313516 A1 * | 12/2009 | Shin | H04L 1/0003 714/748 |
| 2010/0067445 A1 * | 3/2010 | Rinne et al. | 370/329 |
| 2010/0195614 A1 * | 8/2010 | Nimbalker et al. | 370/330 |
| 2010/0215007 A1 * | 8/2010 | Zhang et al. | 370/329 |
| 2010/0251082 A1 * | 9/2010 | Cheng | H03M 13/09 714/807 |

FOREIGN PATENT DOCUMENTS

| | | |
|---|---|---|
| JP | 2003-309538 | 10/2003 |
| JP | 2005-223620 | 8/2005 |
| JP | 2007-526724 | 9/2007 |
| WO | 2007/124675 A1 | 11/2007 |

OTHER PUBLICATIONS

3GPP TS 36.212 V8.3.0; 3rd Generation Partnership Project; Technical Specification Group Radio Access Network; Evolved Universal Terrestrial Radio Access (E-UTRA); Multiplexing and channel coding (Release 8); Dated May 1, 2008.

3GPP TS 36.213 V8.3.0; 3rd Generation Partnership Project; Technical Specification Group Radio Access Network; Evolved Universal Terrestrial Radio Access (E-UTRA); Physical layer procedures (Release 8); Dated May 1, 2008.

Motorola; 3GPP TSG RAN WG1; Meeting #46bis; R1-062597, "Number of HARQ Channels" Seoul, Korea, Oct. 9-13, 2006.

International Search Report issued for corresponding International Patent Application No. PCT/JP2009/001326, mailed Jun. 30, 2009.

Extended European search report with a supplementary European search report and European search opinion issued for corresponding European Patent Application No. 09842139.9 dated Dec. 18, 2014.

* cited by examiner

FIG. 7

| Modulation | Coding Rate | NUMBER OF ASSIGNED RESOURCE BLOCKS |
|---|---|---|
| | | 1 2 3 4 5 6 7 8 9 10 |
| QPSK | 1/9 | |
| | 1/6 | |
| | 1/5 | |
| | 1/3 | |
| 16QAM | 1/3 | |
| | 2/5 | |
| | 1/2 | |
| | 2/3 | |
| 64QAM | 2/3 | |
| | 3/4 | |
| | 4/5 | |
| | 8/9 | |

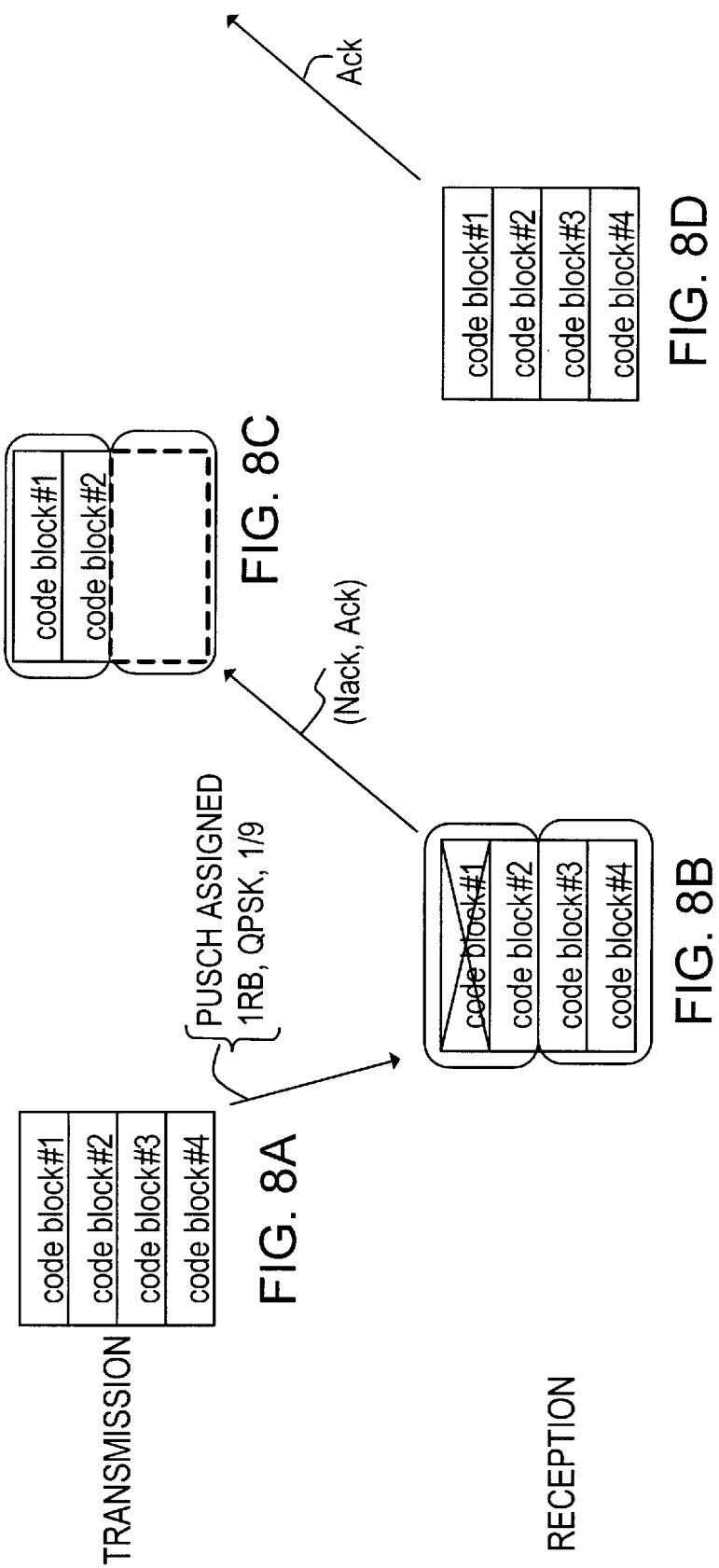

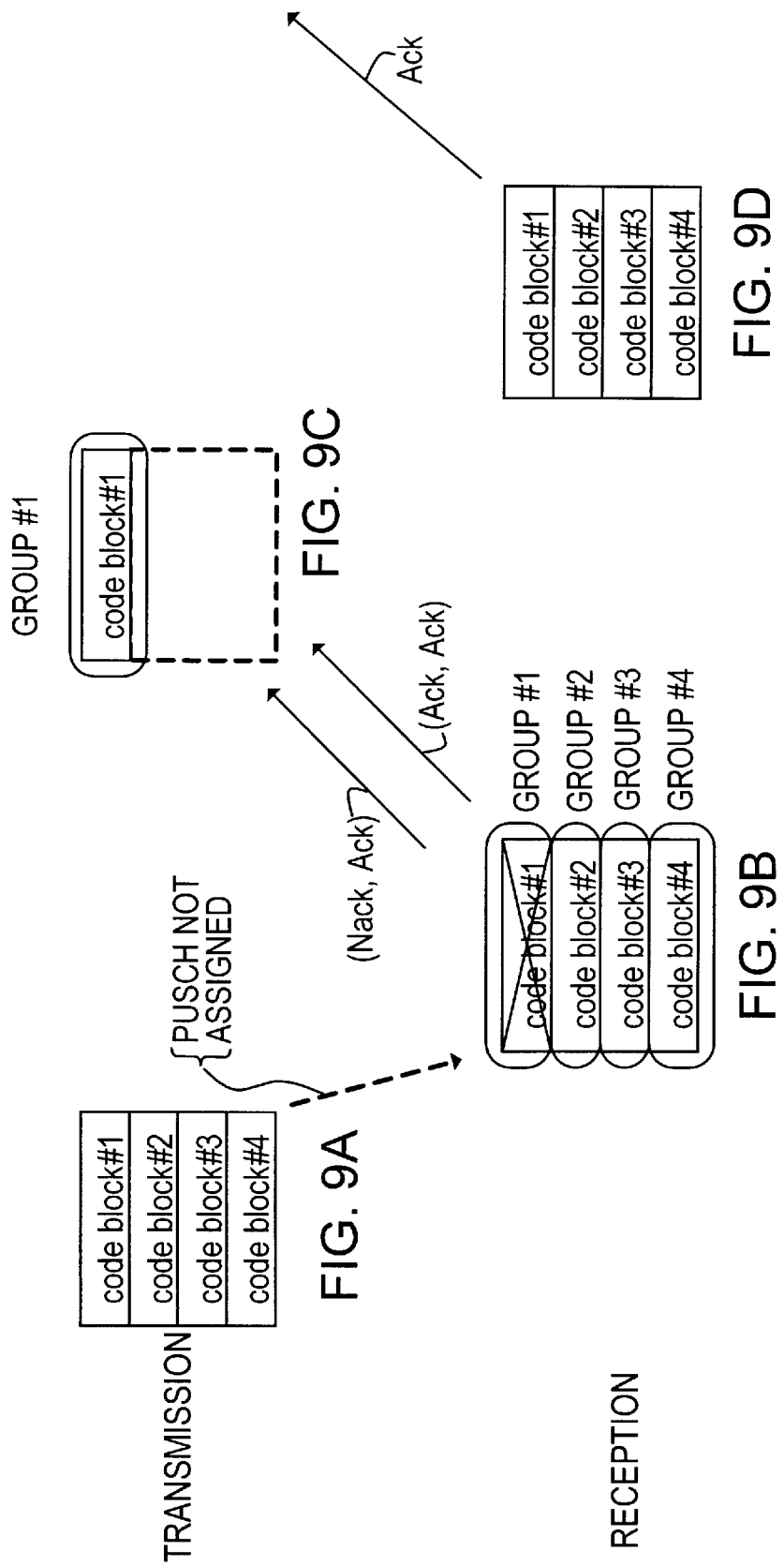

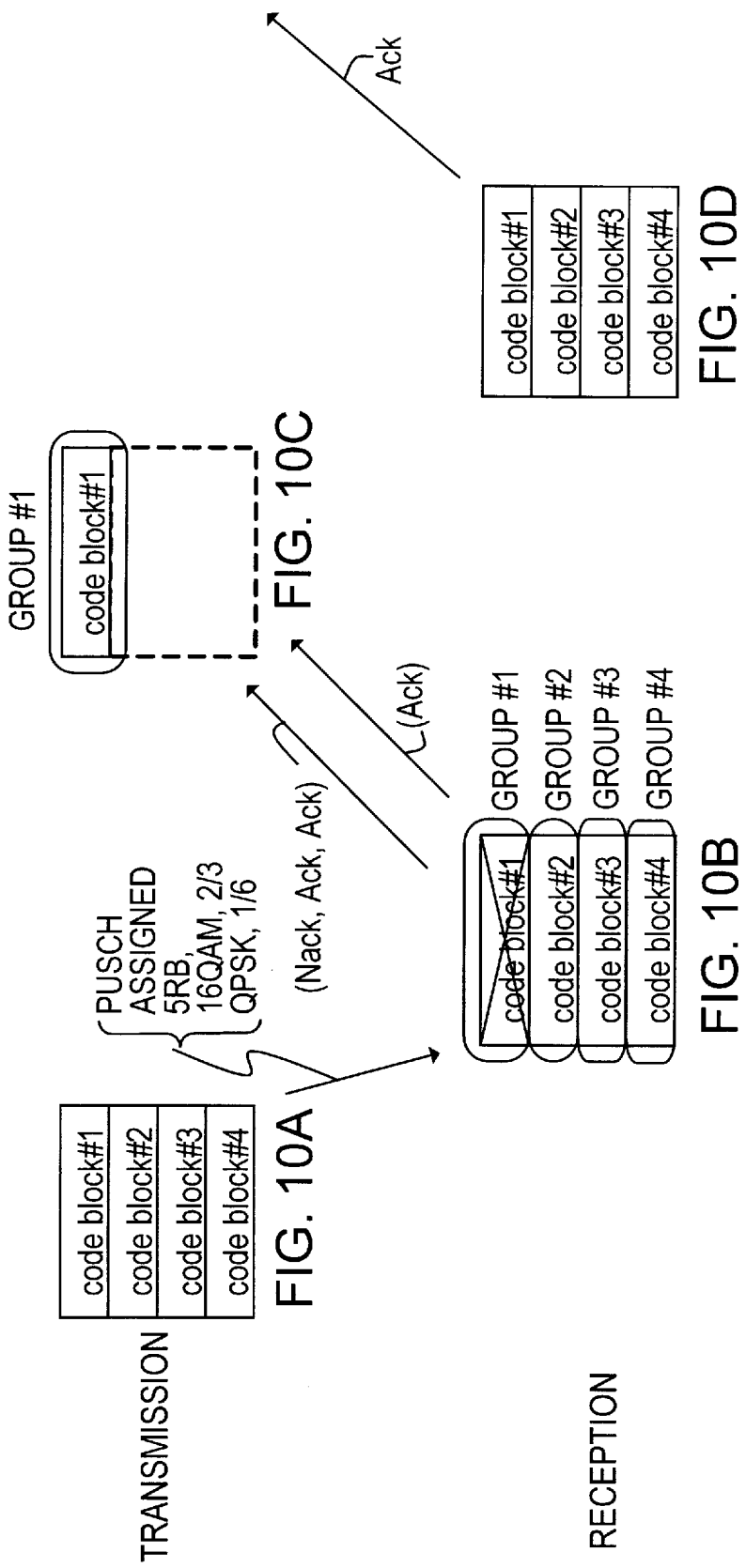

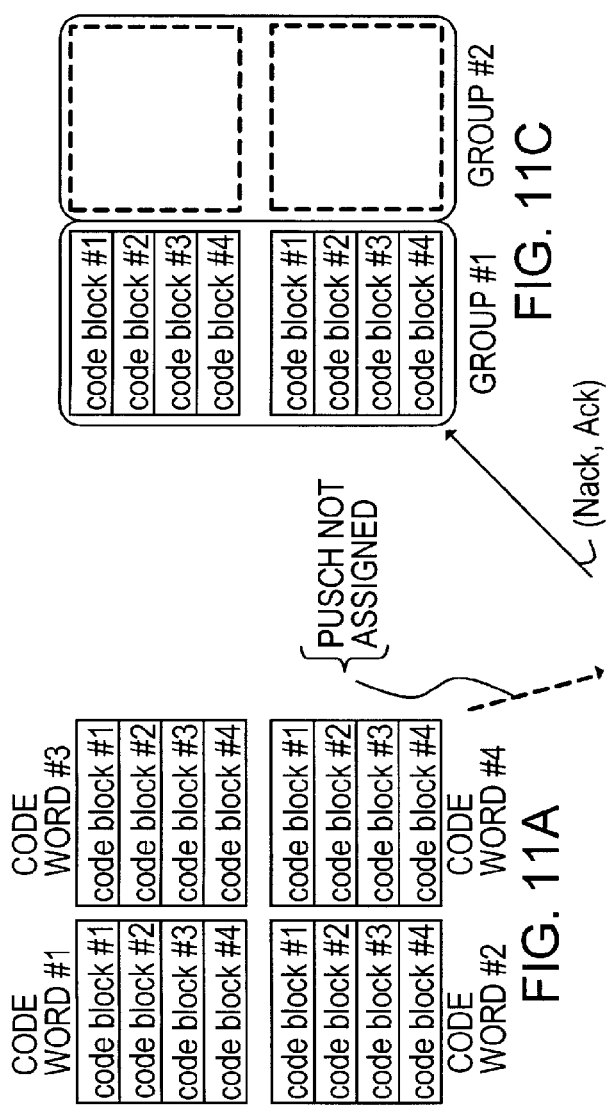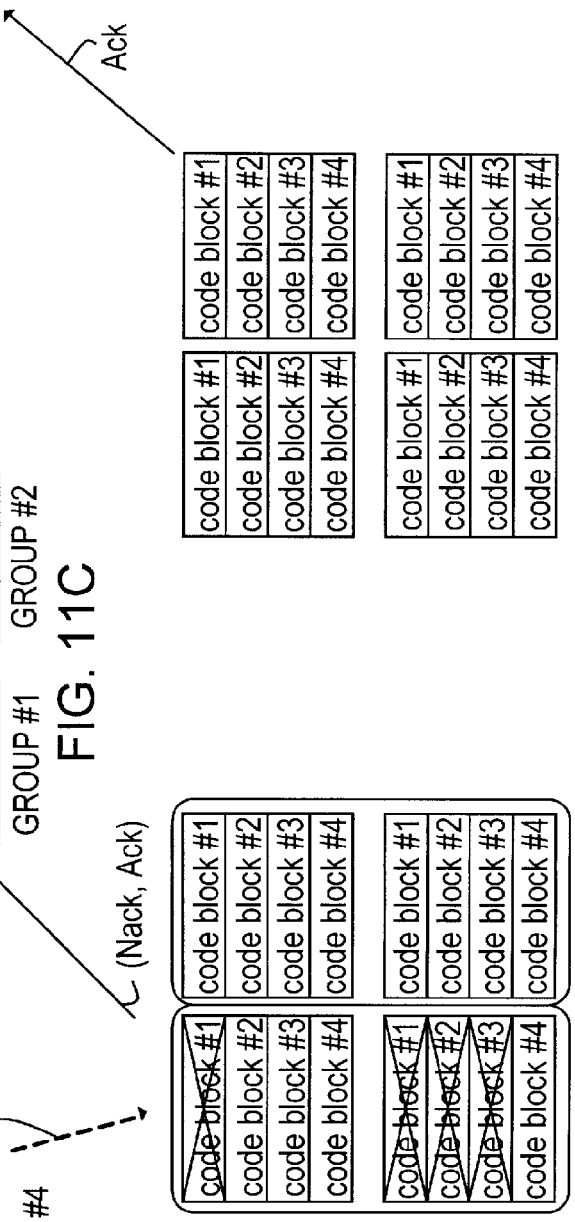

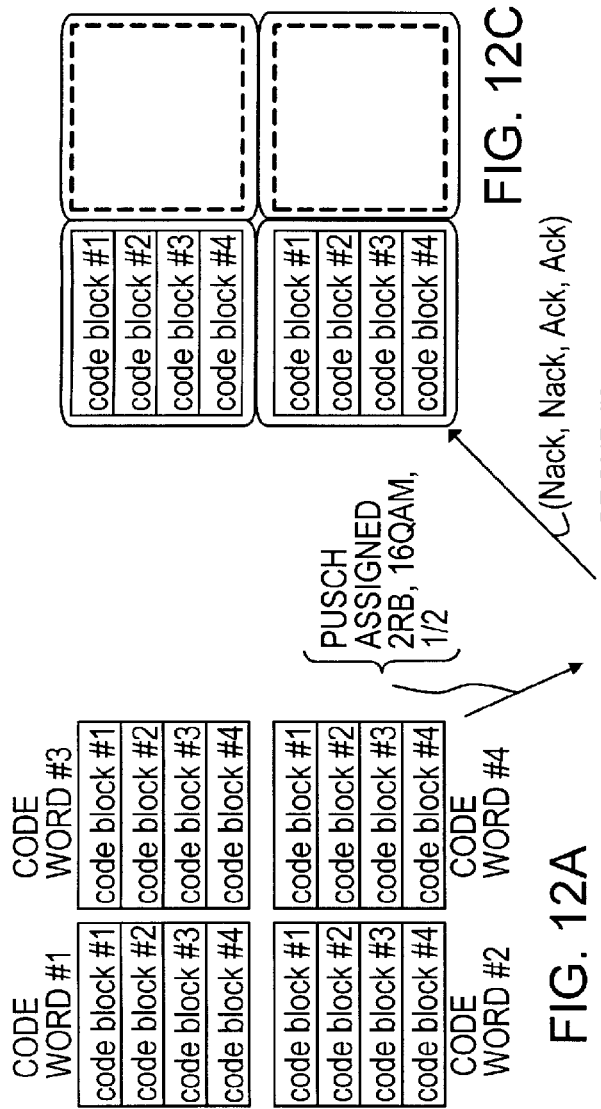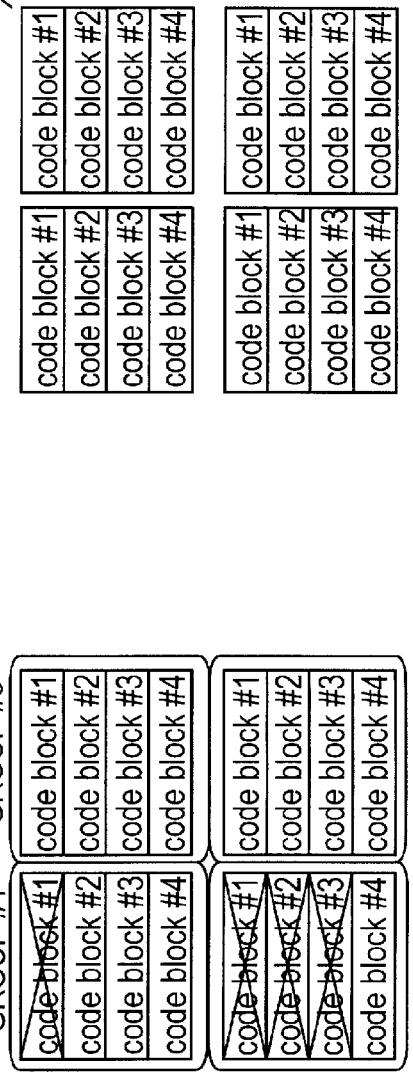
FIG. 12A  FIG. 12B  FIG. 12C  FIG. 12D

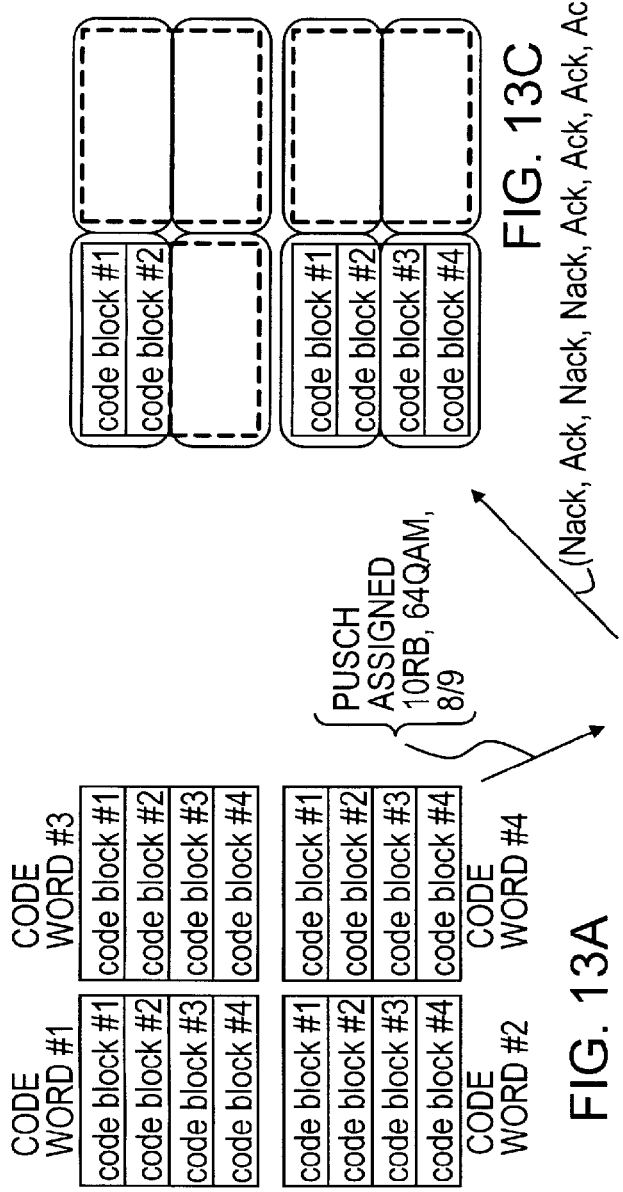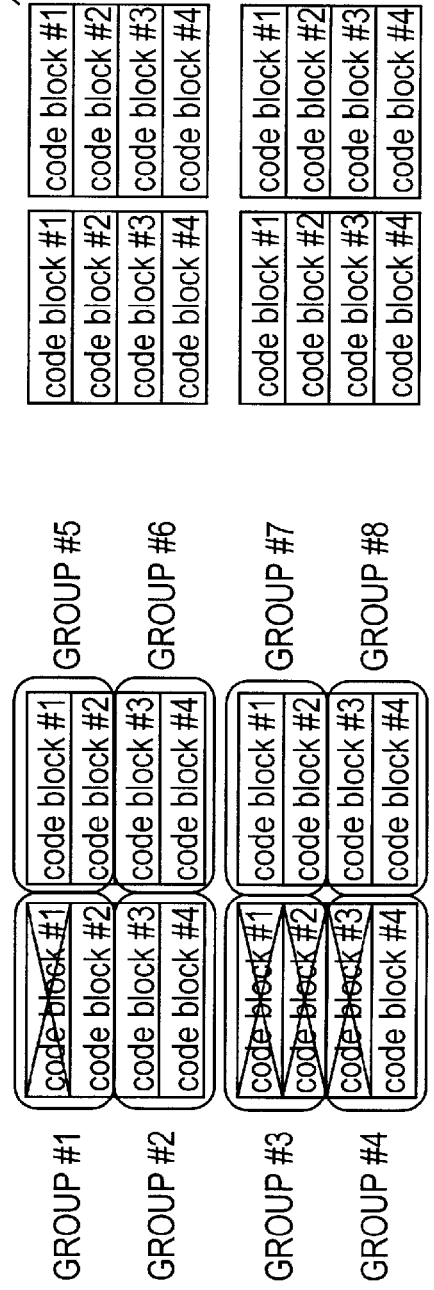

FIG. 14

| Modulation | Coding Rate | Number of Assigned Resource Blocks | | | | | | | | | |
|---|---|---|---|---|---|---|---|---|---|---|---|
| | | 1 | 2 | 3 | 4 | 5 | 6 | 7 | 8 | 9 | 10 |
| QPSK | 1/9 | 2 | 2 | 2 | 3 | 3 | 3 | 4 | 4 | 4 | 5 |
| | 1/6 | 2 | 2 | 3 | 3 | 3 | 4 | 4 | 4 | 5 | 5 |
| | 1/5 | 2 | 3 | 3 | 3 | 4 | 4 | 4 | 5 | 5 | 5 |
| | 1/3 | 3 | 3 | 3 | 4 | 4 | 4 | 5 | 5 | 5 | 6 |
| 16QAM | 1/3 | 3 | 3 | 4 | 4 | 4 | 5 | 5 | 5 | 6 | 6 |
| | 2/5 | 3 | 4 | 4 | 4 | 5 | 5 | 5 | 6 | 6 | 6 |
| | 1/2 | 4 | 4 | 4 | 5 | 5 | 5 | 6 | 6 | 6 | 7 |
| | 2/3 | 4 | 4 | 5 | 5 | 5 | 6 | 6 | 6 | 7 | 7 |
| 64QAM | 2/3 | 4 | 5 | 5 | 5 | 6 | 6 | 6 | 7 | 7 | 7 |
| | 3/4 | 5 | 5 | 5 | 6 | 6 | 6 | 7 | 7 | 7 | 8 |
| | 4/5 | 5 | 5 | 6 | 6 | 6 | 7 | 7 | 7 | 8 | 8 |
| | 8/9 | 5 | 6 | 6 | 6 | 7 | 7 | 7 | 8 | 8 | 8 |

41(25)

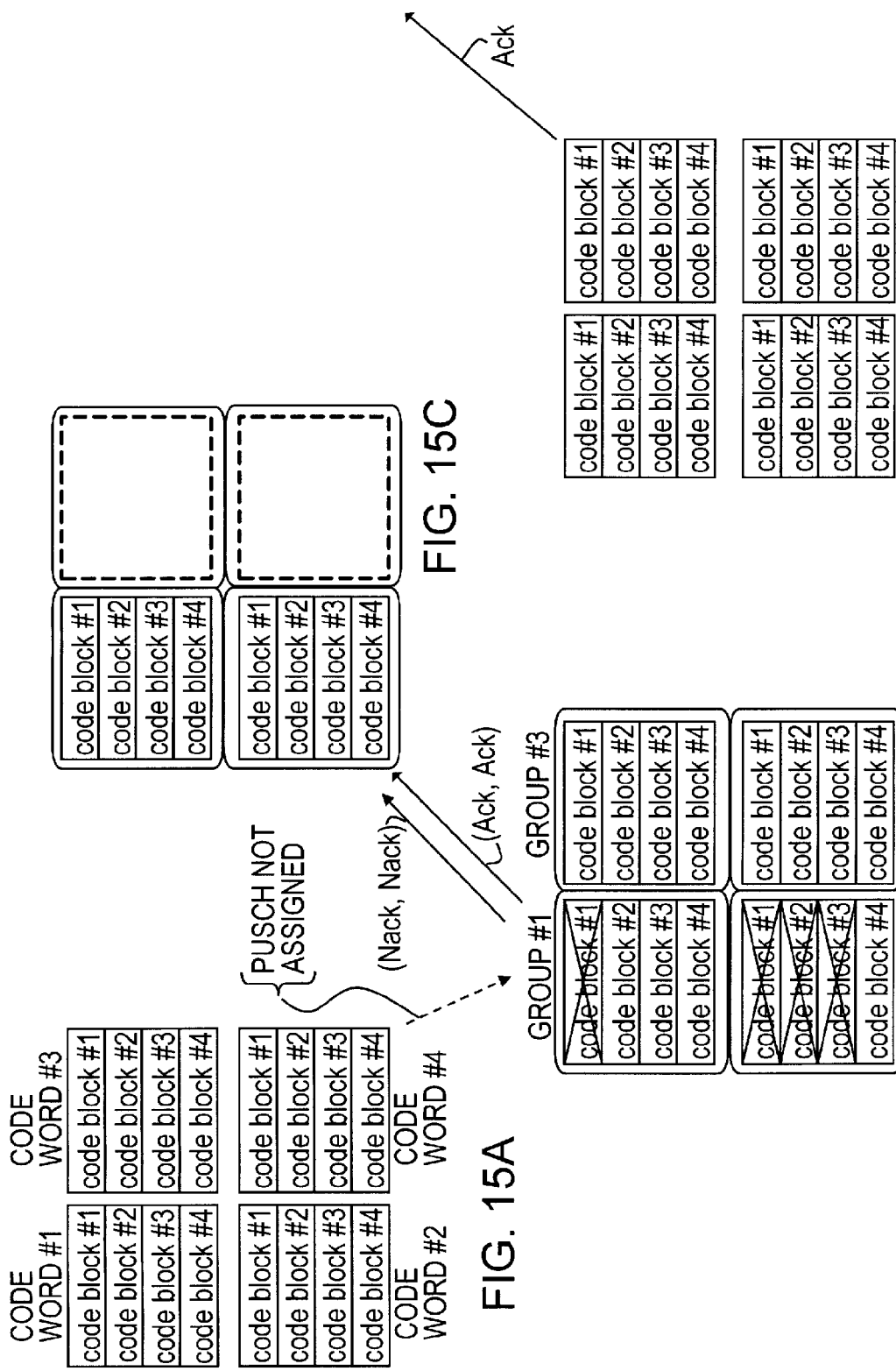

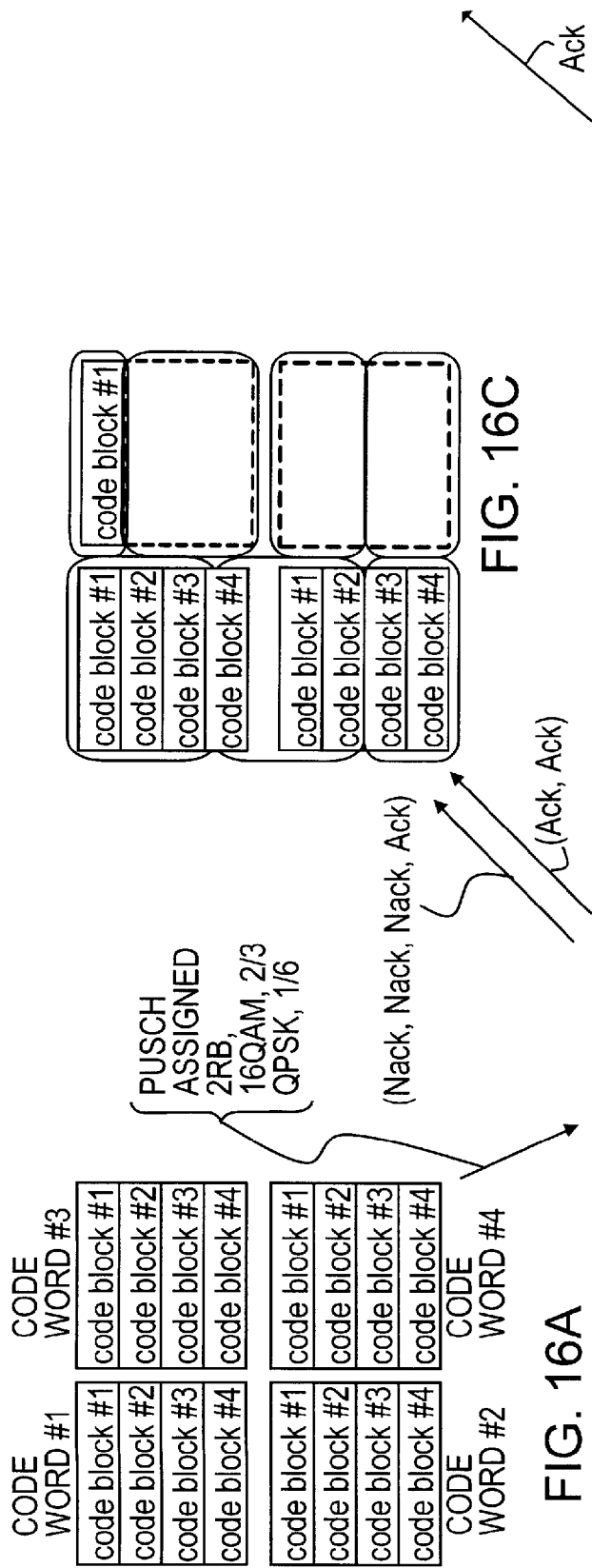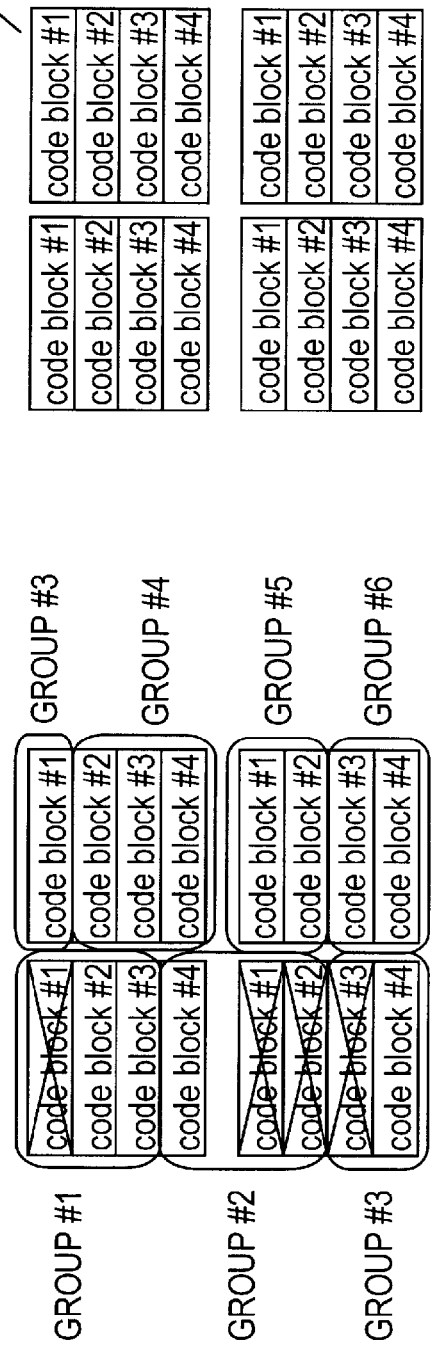

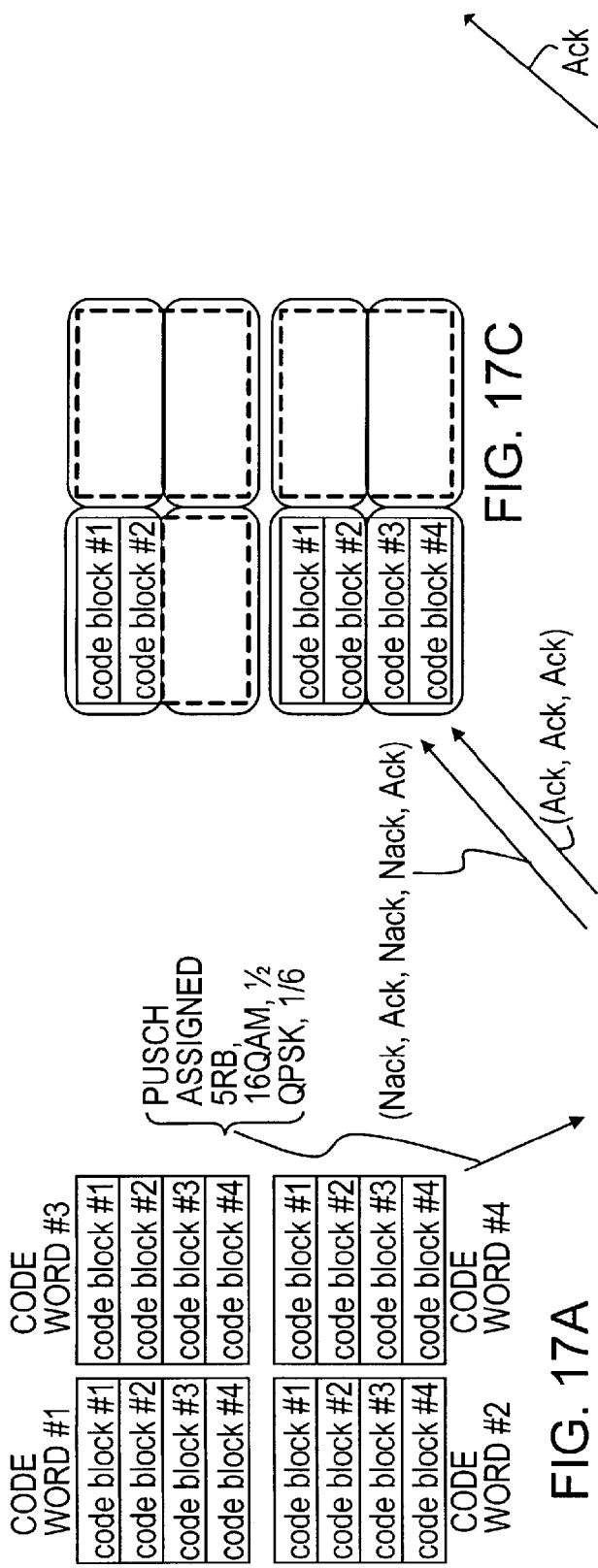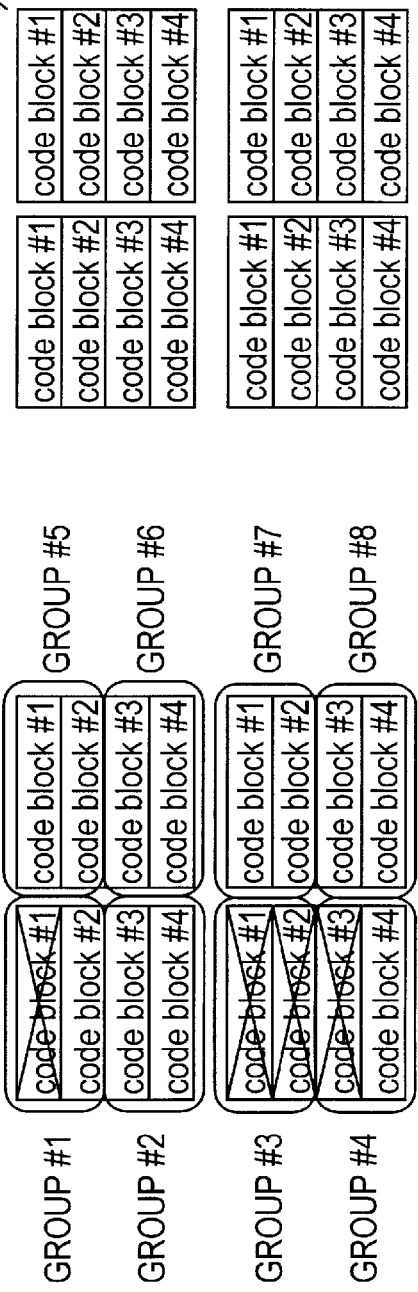
FIG. 17A
FIG. 17B
FIG. 17C
FIG. 17D

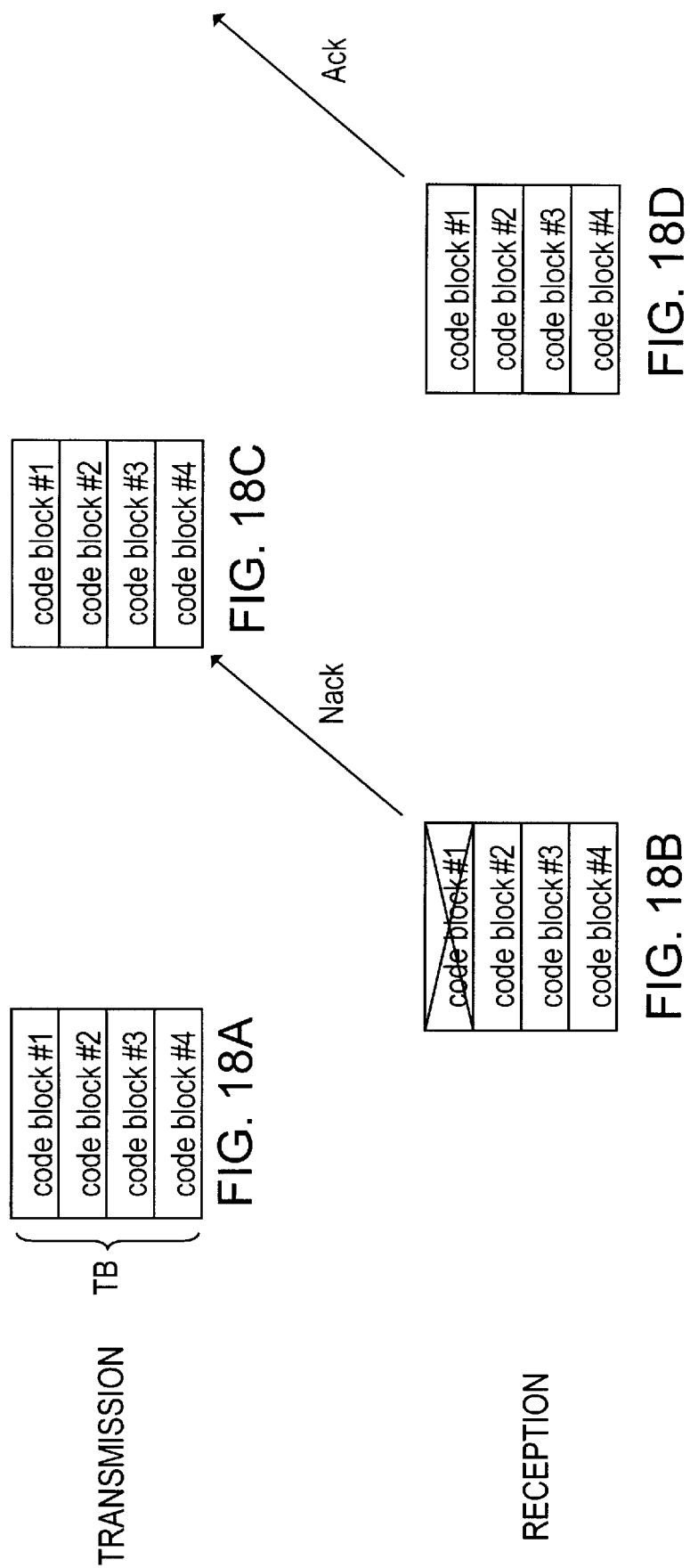

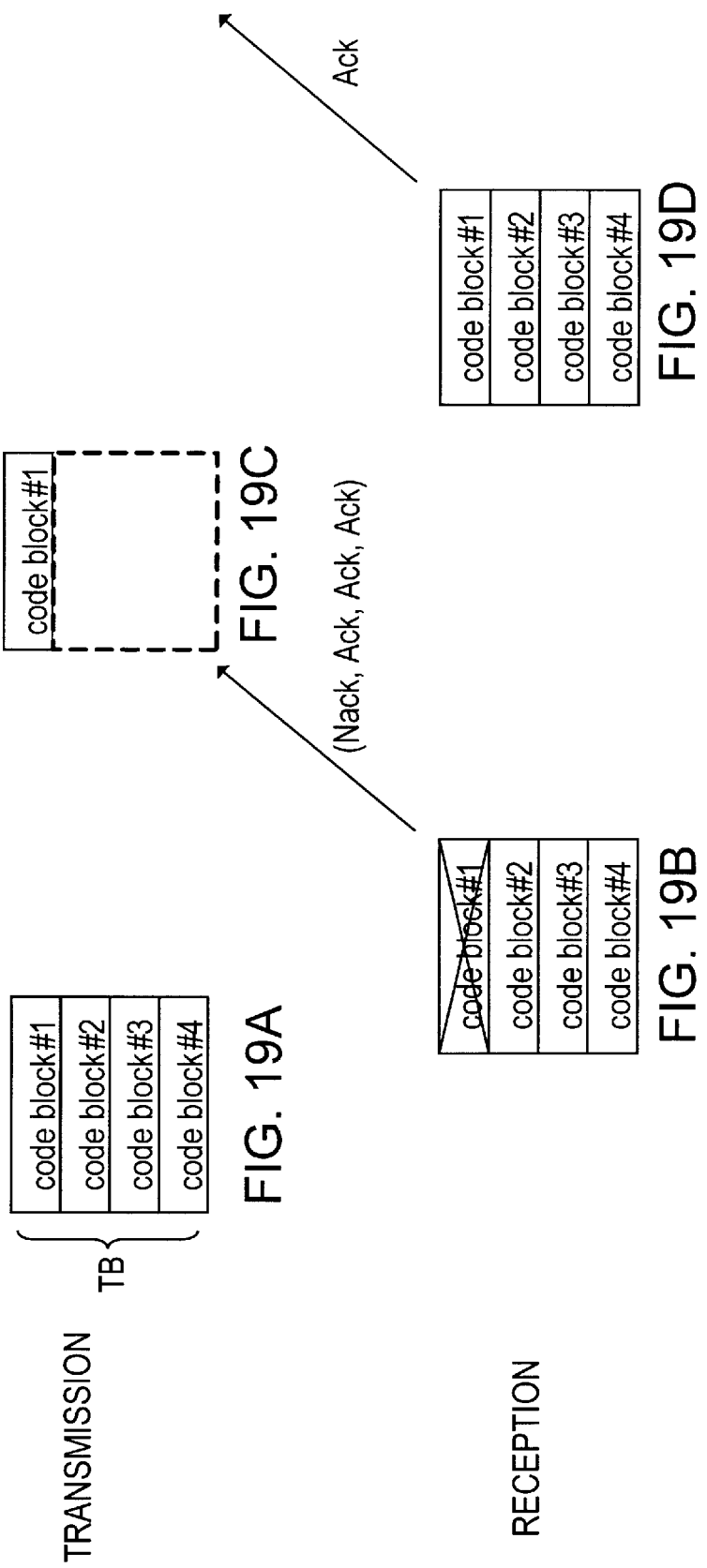

RADIO COMMUNICATION SYSTEM, MOBILE STATION APPARATUS, BASE STATION APPARATUS, AND RADIO COMMUNICATION METHOD IN RADIO COMMUNICATION SYSTEM

CROSS-REFERENCE TO RELATED APPLICATION

This application is a continuation of International Application No. PCT/JP2009/001326, filed on Mar. 25, 2009, now pending, herein incorporated by reference.

TECHNICAL FIELD

The embodiments discussed herein are related to a radio communication system, a mobile station apparatus, a base station apparatus, and a radio communication method in a radio communication system.

BACKGROUND ART

HARQ (Hybrid Automatic Repeat reQuest) is a prior art available as a retransmission control technology in a radio communication system. For example, HARQ is used for 3GPP LTE (for example, Non-patent Documents 1 to 3).

A mobile station apparatus feeds back ACK in TB units using UCI (Uplink Control Information) if there is no error in a transport block (hereafter TB) transmitted from a base station apparatus, or feeds back NACK in TB units if there is an error. The base station apparatus transmits a new TB if ACK is received, or retransmits the same TB if NACK is received (see FIG. 18A to FIG. 18D).

In LTE, there are two types of physical channels to transmit UCI: PUSCH (Physical Uplink Shared Channel) for transmitting data signal; and PUCCH (Physical Uplink Control Channel) for transmitting control signal. If PUSCH is assigned from the base station apparatus at the timing of transmitting ACK or NACK, the mobile station apparatus transmits ACK or NACK using PUSCH. If PUSCH is not assigned, on the other hand, the mobile station apparatus transmits ACK or NACK using PUCCH.

Another available retransmission technology is that if a plurality of code blocks (hereafter CB(s)) are included in TB, the mobile station apparatus transmits ACK or NACK in CB units and the base station apparatus retransmits the data in CB units (for example, Non-patent Document 4, FIG. 19A to FIG. 19D).

Non-patent Document 1: 3GPPTS36.211 V8.3.0
Non-patent Document 2: 3GPPTS36.212 V8.3.0
Non-patent Document 3: 3GPPTS36.213 V8.3.0
Non-patent Document 4: 3GPPTSG RAN WG1 R1-062597, "Number of HARQ Channels", Motorola

DISCLOSURE OF THE INVENTION

Problems to be Solved by the Invention

However if a plurality of CBs are transmitted from the base station apparatus at the same time when ACK or NACK is always fed back in CB units, the mobile station apparatus transmits a number of ACKs or NACKs in proportion to the number of CBs. In this case as well, overhead of the up direction increases and frequency utilization efficiency drops.

If a plurality of TBs are transmitted from the base station apparatus at the same time when ACK or NACK is always fed back in TB units, the mobile station apparatus transmits a number of ACKs or NACKs in proportion to the number of TBs. In this case as well, overhead of the up direction increases, and frequency utilization drops.

Means for Solving the Problem

According to an aspect of the invention, a radio communication system includes: a base station apparatus; and a mobile station apparatus, wherein the base station apparatus and the mobile apparatus performs radio communication, the mobile station apparatus includes: a receiver which receives data signal transmitted from the base station apparatus; a controller which switches a unit of grouping to the data signal and groups the data signal, according to one parameter or a combination of a plurality of parameters out of a type of a channel, a type of modulation scheme and encoding rate, an assigned resource amount, or a number of transmitting antennas of the mobile station apparatus, when an ACK signal or an NACK signal to the data signal is transmitted; and a transmitter which transmits the ACK signal or the NACK signal in each the group, and the base station apparatus includes: a transmitter which transmits the data signal; and a receiver unit which receives the ACK signal or the NACK signal.

Furthermore, according to an aspect of the invention, a mobile station apparatus for performing radio communication with a base station apparatus, the mobile station apparatus includes: a receiver which receives data signal transmitted from the base station apparatus; a controller which switches a unit of grouping to the data signal and groups the data signal, according to one parameter or a combination of a plurality of parameters out of a type of a channel, a type of modulation scheme and encoding rate, an assigned resource amount, or a number of transmitting antennas of the mobile station apparatus, when an ACK signal or an NACK signal to the data signal is transmitted; and a transmitter which transmits the ACK signal or the NACK signal in each the group.

Furthermore, according to an aspect of the invention, a base station apparatus for performing radio communication with a mobile station apparatus, the base station apparatus includes: a transmitter which transmits data signal; and a receiver which receives an ACK signal or an NACK signal transmitted by the mobile station apparatus in each group which is obtained by switching a unit of the grouping to the data signal and by grouping the data signal, according to one parameter or a combination of a plurality of parameters out of a type of a channel, a type of modulation scheme and encoding rate, an assigned resource amount, or a number of transmitting antennas of the mobile station apparatus, when the mobile station apparatus transmits the ACK signal or the NACK signal to the data signal.

Furthermore, according to an aspect of the invention, a radio communication method in a radio communication system for performing radio communication between a base station apparatus and a mobile station apparatus, the method includes: transmitting the data signal by the base station apparatus; receiving the data signal, switching a unit of grouping of the data signal and grouping the data signal, according to one parameter or a combination of a plurality of parameters out of a type of a channel, a type of modulation scheme and encoding rate, an assigned resource amount, or a number of transmitting antennas of the mobile station apparatus, when an ACK signal or an NACK signal to the data signal is transmitted, and transmitting the ACK signal or the NACK signal in each group obtained by the grouping, by the mobile station apparatus, and receiving the ACK signal or the NACK signal by the base station apparatus.

Effectiveness of the Invention

A radio communication system, a mobile station apparatus, a base station apparatus, and a radio communication method in a radio communication system, where frequency utilization efficiency is improved, can be provided.

BRIEF DESCRIPTION OF THE DRAWINGS

FIG. 7 illustrates an example of a granularity decision table;
FIG. 8A to FIG. 8D illustrate another example of grouping;
FIG. 9A to FIG. 9D illustrate another example of grouping;
FIG. 10A to FIG. 10D illustrate another example of grouping;
FIG. 11A to FIG. 11D illustrate another example of grouping;
FIG. 12A to FIG. 12D illustrate another example of grouping;
FIG. 13A to FIG. 13D illustrate another example of grouping;
FIG. 14 illustrates another example of a granularity decision table;
FIG. 15A to FIG. 15D illustrate another example of grouping;
FIG. 16A to FIG. 16D illustrate another example of grouping;
FIG. 17A to FIG. 17D illustrate another example of grouping;
FIG. 18A to FIG. 18D illustrate a prior art of grouping;
and
FIG. 19A to FIG. 19D illustrate a prior art of grouping.
1: radio communication system, 10: base station apparatus, 11-1: transport block CRC adding unit, 12-1: code block division CRC adding unit, 13-1: channel encoding unit, 14-1: rate matching unit, 15: retransmission bit selection unit, 16: modulation unit, 17-1: radio processing unit, 18-1: transmitting antenna, 20: control signal generation unit, 21-1: receiving antenna, 22-1: radio processing unit, 23: ACK/NACK information demodulation unit, 24: scheduling information storage unit, 25: retransmission granularity decision table storage unit, 26: retransmission granularity controller, 30: mobile station, 31-1: receiving antenna, 32-1: radio processing unit, 33: demodulation unit, 34: retransmission bit determination unit, 35-1: derate matching unit, 36-1: channel decoding unit, 37-1: code block CRC determination unit, 38-1: transport block CRC determination unit, 40: control signal receiver, 41: retransmission granularity decision table storage unit, 42: scheduling information storage unit, 43: retransmission granularity controller, 44: ACK/NACK information generation unit, 45: ACK/NACK information modulation unit, 46-1: radio processing unit, 47-1: transmitting antenna

BEST MODE FOR CARRYING OUT THE INVENTION

Embodiments for carrying out the present invention will now be described.

First Embodiment

Figure 1:
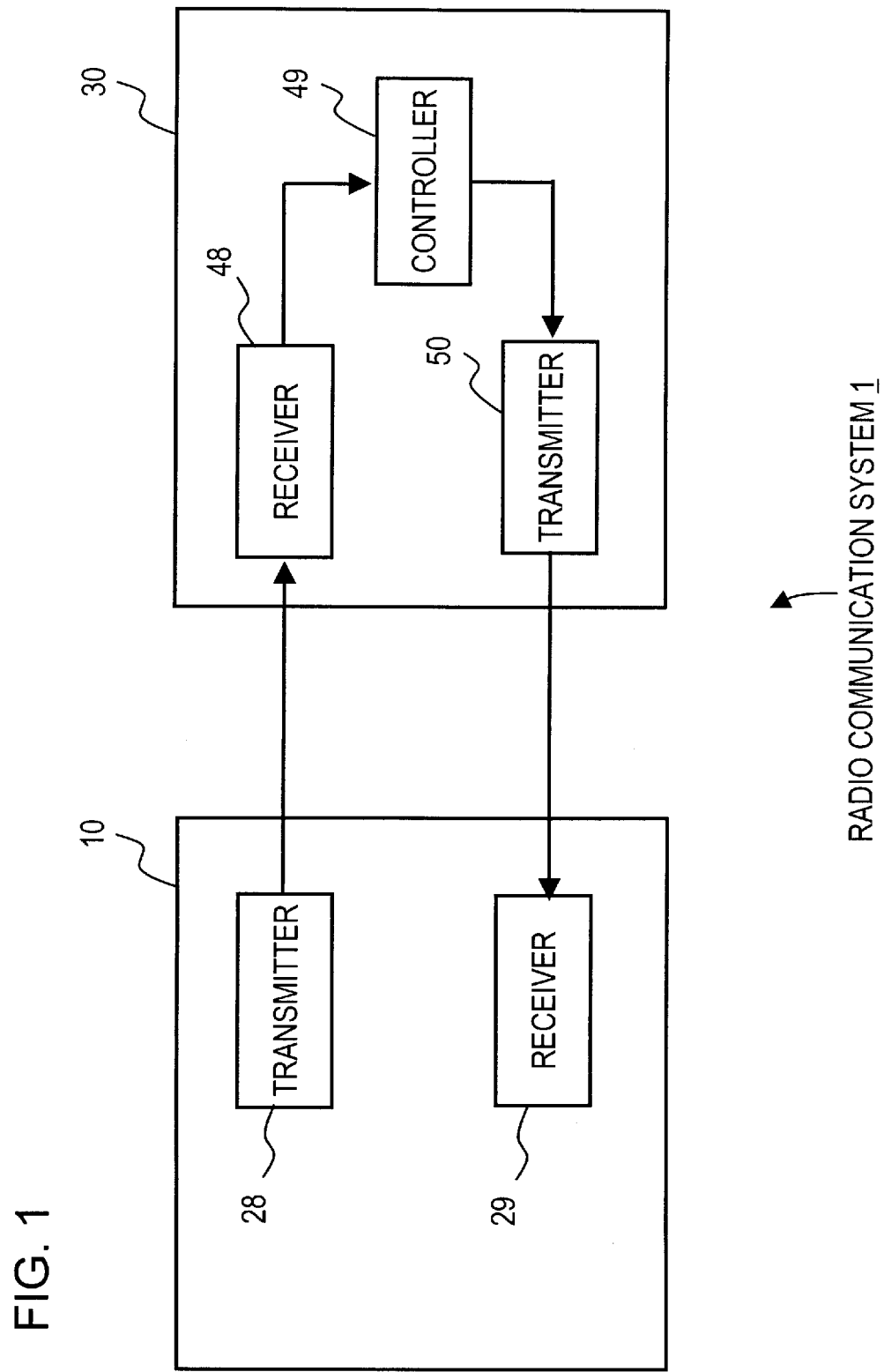
FIG. 1 illustrates a configuration example of a radio communication system.

A first embodiment will be described. FIG. 1 illustrates a configuration example of a radio communication system 1. In the radio communication system 1 which performs radio communication between a base station apparatus 10 and a mobile station apparatus 30, the mobile station apparatus 30 includes: a receiver 48 which receives data signal transmitted from the base station apparatus 10; a controller 49 which may be realized by a processor (e.g., Central Processing Unit (CPU)) and switches a unit of grouping the data signal and groups the data signal, according to one parameter (C or M or R or A) out of a type of a channel (C), a type of modulation scheme and encoding rate (M), an assigned resource amount (R), and a number of transmitting antennas of the mobile station apparatus 30 (A), when an ACK signal or an NACK signal to the data signal is transmitted, or a combination (C and M, C and R, C and A, C and M and R, C and M and A, C and R and A, C and M and R and A, M and R, M and A, M and R and A, or R and A) of these parameters (C, M, R, and A); and a transmitter 50 which transmits the ACK signal or the NACK signal in each the group, and the base station apparatus 10 includes a transmitter 28 which transmits the data signal, and a receiver 29 which receives the ACK signal and the NACK signal.

The controller 49 of the mobile station apparatus 30 switches a unit of grouping of the data signal transmitted from the base station apparatus 10 and groups the data signal, according to one parameter or a combination of a plurality of parameters out of a type of a channel, a type of modulation scheme and encoding rate, an assigned resource amount, and a number of transmitting antennas of the mobile station apparatus 30, when the ACK signal or the NACK signal is transmitted. Then the transmitter 50 transmits one ACK signal (indicates that there is no error in the group) or one NACK signal (indicates that there is an error in the group) to the base station apparatus 10 in each the group.

In this way, the mobile station apparatus 30 changes grouping of the data signal according to the type of the channel, or the like, and transmits the ACK signal or the NACK signal in each the group. Therefore, compared with the case of transmitting the ACK signal or the NACK signal in transport block units or in code block units, frequency utilization efficiency can be improved.

Second Embodiment

Figure 2:
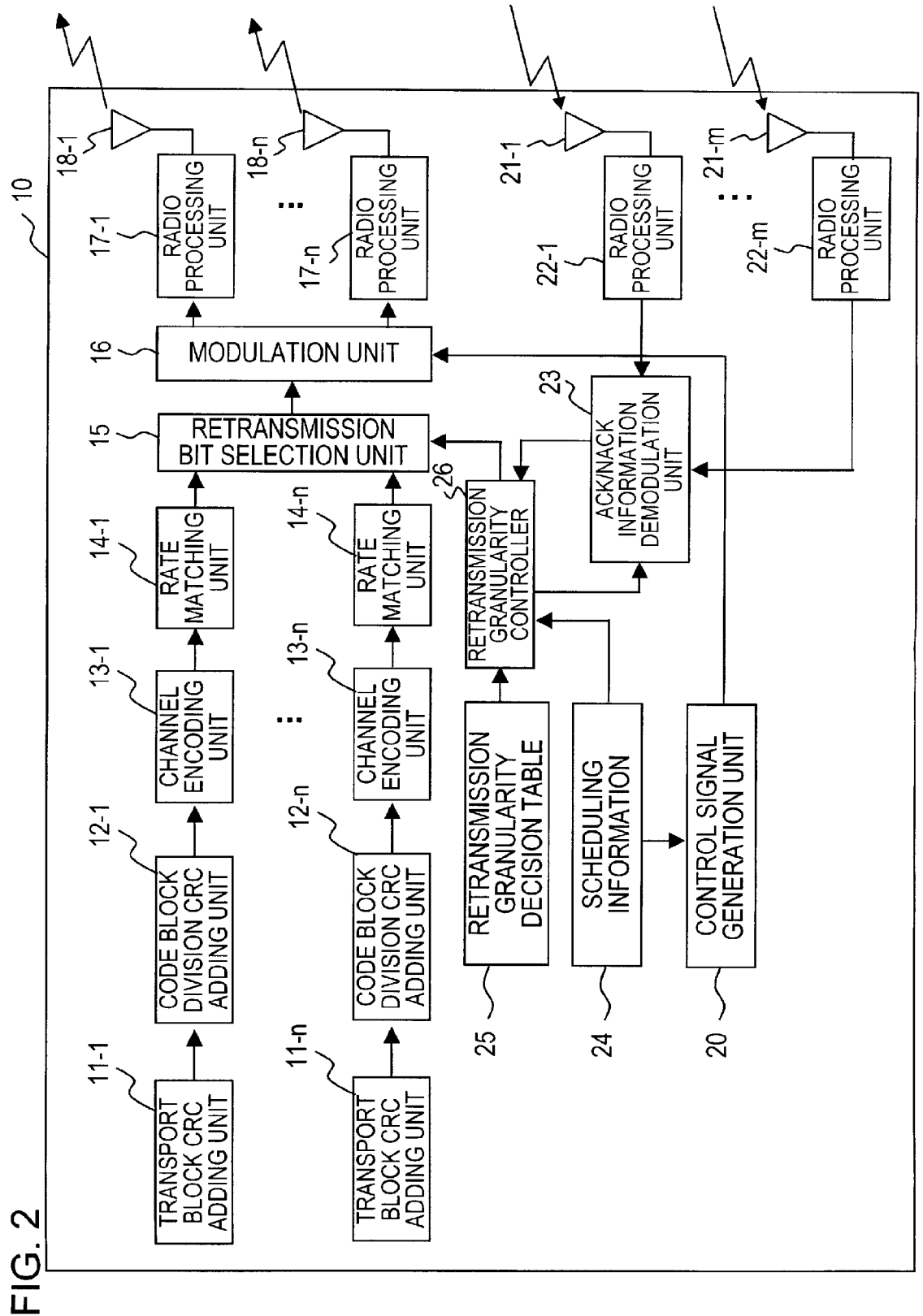
FIG. 2 illustrates a configuration example of a base station apparatus.
Figure 3:
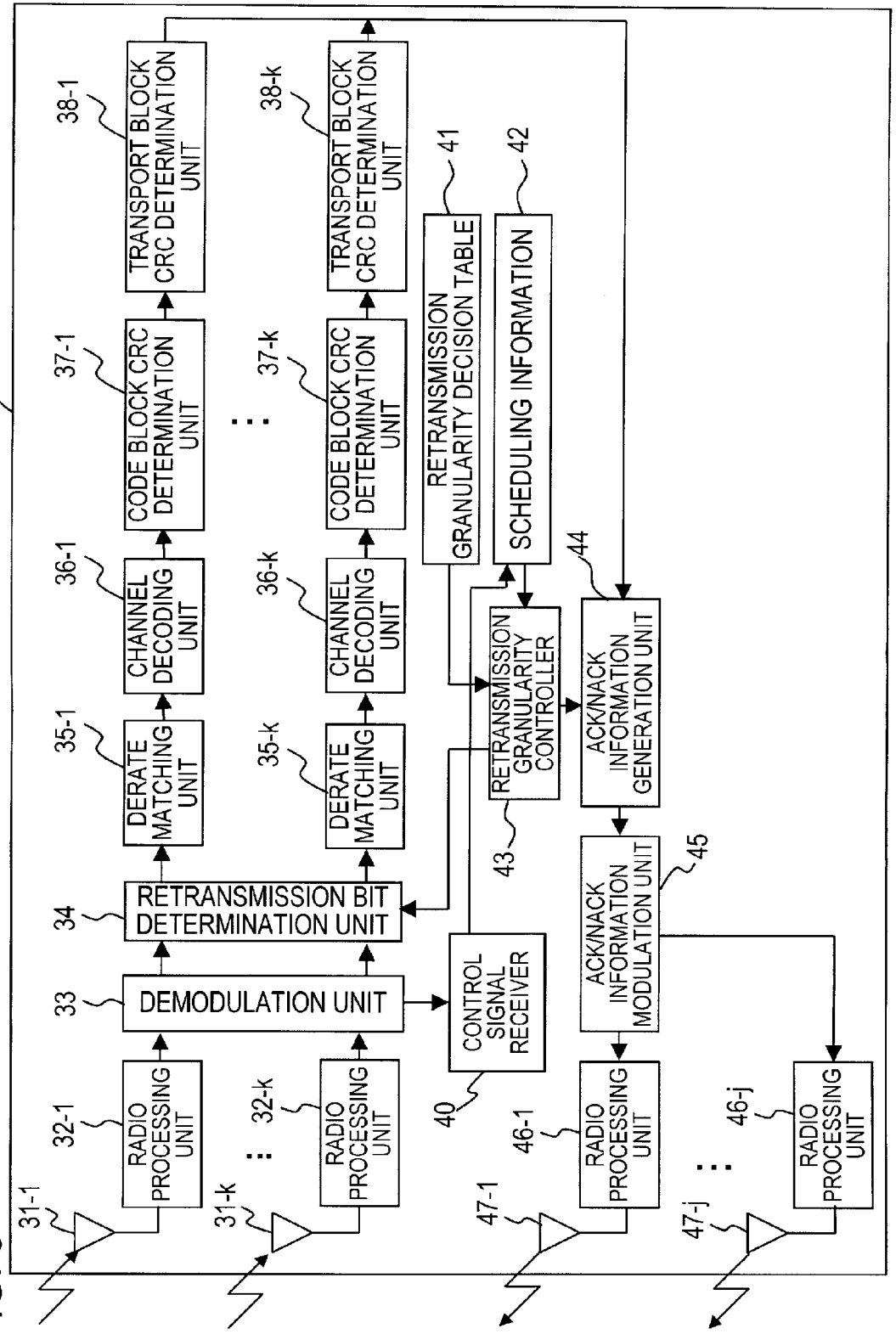
FIG. 3 illustrates a configuration example of a mobile station apparatus.

A second embodiment will now be described. FIG. 2 illustrates a configuration example of the base station apparatus (hereafter base station) 10 in the radio communication system 1, and FIG. 3 illustrates a configuration example of the mobile station apparatus (hereafter mobile station) 30.

The base station 10 includes transport block CRC adding units (hereafter TBCRC adding units) 11-1 to 11-$n$ ($n$ is 2 or greater integer), code block division CRC adding units (hereafter CB division CRC adding units) 12-1 to 12-$n$, channel encoding units 13-1 to 13-$n$, rate matching units 14-1 to 14-$n$, a retransmission bit selection unit 15, a modulation unit 16, radio processing units 17-1 to 17-$n$, transmitting antennas 18-1 to 18-$n$, a control signal generation unit 20, receiving antennas 21-1 to 21-$m$ ($m$ is 2 or greater integer), radio processing units 22-1 to 22-$m$, an ACK/NACK information demodulation unit 23, a scheduling information storage unit 24, a retransmission granularity decision table storage unit 25, and a retransmission granularity controller 26.

The transmitter 28 according to the first embodiment corresponds, for example, to the TBCRC adding units 11-1 to 11-$n$, the CB division CRC adding units 12-1 to 12-$n$, the channel encoding units 13-1 to 13-$n$, the rate matching units 14-1 to 14-$n$, the modulation unit 16, the radio processing units 17-1 to 17-$n$, and the transmitting antennas 18-1 to 18-$n$. The receiver 29 according to the first embodiment corresponds, for example, to the receiving antennas 21-1 to 21-$m$, radio processing units 22-1 to 22-$m$, and the ACK/NACK information demodulation unit 23.

The TBCRC adding units 11-1 to 11-$n$ add a CRC (Cyclic Redundancy Code) for error detection to a data bit string called a "transport block" (hereafter TB). A TB is a basic unit for the base station 10 or the mobile station 30 to transmit data signal. A size of a TB may be predetermined, or may be variable depending on the propagation path status or the like.

When a number of bits in a data bit string included in TB exceeds a threshold, the CB division CRC adding units 12-1 to 12-$n$ divide the TB into a plurality of code blocks (hereafter CBs). The CB division CRC adding units 12-1 to 12-$n$ add CRC to each code block, and outputs the code block.

The channel encoding units 13-1 to 13-$n$ perform channel encoding for the data signal included in CB.

The rate matching units 14-1 to 14-$n$ perform rate matching processing for systematic bits and parity bits, which are output from the channel encoding units 13-1 to 13-$n$, by performing sub-block interleave.

Based on the signal from the retransmission granularity controller 26, the retransmission bit selection unit 15 selects and outputs a retransmission target transmission bits out of the output from the rate matching units 14-1 to 14-$n$. For transmitting data signal for the first time, the retransmission bit selection unit 15 outputs all the outputs from the rate matching units 14-1 to 14-$n$ to the modulation unit 16.

The modulation unit 16 performs modulation on the output from the retransmission bit selection unit 15 according to MCS determined by the base station 10.

The radio processing units 17-1 to 17-$n$ perform such processing as sub-carrier mapping and conversion into signal in the time domain, on the output from the modulation unit 16, and outputs radio signal. The radio signal is transmitted to the mobile station 30 via the transmitting antennas 18-1 to 18-$n$.

The base station 10 illustrated in FIG. 2 is an example in a case of performing MIMO spatial multiplexed transmission. If the base station 10 does not perform the MIMO transmission, the base station 10 may include the TBCRC adding unit 11-1, the CB division CRC adding unit 12-1, the channel encoding unit 13-1 and the rate matching unit 14-1.

The control signal generation unit 20 reads the scheduling information from the scheduling information storage unit 24, generates control signal which includes the scheduling information, and outputs the control signal to the modulation unit 16. The control signal and data signal are transmitted to the mobile station 30 via the transmitting antennas 18-1 to 18-$n$. The scheduling information includes such information as the assignment of PUSCH for the mobile station 30, MCS (Modulation and Coding Scheme), and a number of assigned resource blocks (hereafter RBs) when PUSCH is assigned, and spatial multiplicity when MIMO transmission is performed.

The receiving antennas 21-1 to 21-$m$ receive the radio signal transmitted from the mobile station 30.

The radio processing units 22-1 to 22-$m$ perform sub-carrier demapping processing on the radio signal received by the receiving antennas 21-1 to 21-$m$.

The ACK/NACK information demodulation unit 23 demodulates ACK or NACK information out of the radio signal from the mobile station 30, and outputs the demodulated ACK or NACK information to the retransmission granularity controller 26.

The scheduling information storage unit 24 stores the above mentioned scheduling information.

The retransmission granularity decision table storage unit 25 stores the retransmission granularity decision table for deciding the granularity of the retransmission control. Details will be described later.

The retransmission granularity controller 26 decides the granularity of retransmission control based on the retransmission granularity decision table stored in the retransmission granularity decision table storage unit 25, or a maximum number of bits in the modulation schemes. The retransmission granularity controller 26 determines a group to which the ACK information or the NACK information was fed back, and specifies a transmission bits belonging to the group to which the NACK information information is fed back. The retransmission granularity controller 26 outputs signal including the specified information to the retransmission bit selection unit 15. The retransmission bit selection unit 15 selects the retransmission target transmission bits based on the specified information, and outputs the selected transmission bits to the modulation unit 16. Details on the granularity decision will be described later.

The retransmission granularity controller 26 outputs the scheduling information to the ACK/NACK information demodulation unit 23. The ACK/NACK information demodulation unit 23 demodulates the ACK or NACK transmitted from the mobile station 30 based on the scheduling information.

Now a configuration example of the mobile station 30 will be described. The mobile station 30 includes receiving antennas 31-1 to 31-$k$, a demodulation unit 33, a retransmission bit determination unit 34, derate matching units 35-1 to 35-$k$, channel decoding units 36-1 to 36-$k$, code block CRC determination units (hereafter CBCRC determination units) 37-1 to 37-$k$ ($k$ is 2 or greater integer), transport block CRC determination units 38-1 to 38-$k$, a control signal receiver 40, a retransmission granularity decision table storage unit 41, a scheduling information storage unit 42, a retransmission granularity controller 43, an ACK/NACK information generation unit 44, an ACK/NACK information modulation unit 45, radio processing units 46-1 to 46-$j$ ($j$ is 2 or greater integer), and transmitting antennas 47-1 to 47-$j$.

The receiver 48 according to the first embodiment corresponds, for example, to the receiving antennas 31-1 to 31-$k$, the radio processing units 32-1 to 32-$k$, the demodulation unit 33, the derate matching units 35-1 to 35-$k$, the channel decoding units 36-1 to 36-$k$, and the TBCRC determination units 38-1 to 38-$k$. The controller 49 according to the first embodiment corresponds, for example, to the retransmission granularity controller 43. The transmitter 50 according to the first embodiment corresponds to the ACK/NACK information generation unit 44, the ACK/NACK information modulation unit 45, the radio processing units 46-1 to 46-$j$, and the transmitting antennas 47-1 to 47-$j$.

The receiving antennas 31-1 to 31-$k$ receives the radio signal transmitted from the base station 10.

The radio processing units 32-1 to 32-$k$ performs such processing as sub-carrier demapping for the received radio signal.

The demodulation unit 33 demodulates output signals from the radio processing units 32-1 to 32-$k$. The demodulation unit 33 outputs the data signal after demodulation to the retransmission bit determination unit 34, and outputs the control signal after demodulation to the control signal receiver 40.

Based on a request signal from the retransmission granularity controller 43, the retransmission bit determination unit 34 selects and outputs the retransmission bits included in the data signal retransmitted from the base station 10 for the first time, out of the output from the demodulation unit 33. For the data signal transmitted from the base station 10, the transmission bit determination unit 34 outputs these data signal directly to the derate matching units 35-1 to 35-$k$.

The derate matching units 35-1 to 35-$k$ perform derate matching processing for the signal after demodulation which is output from the retransmission bit determination unit 34.

The channel decoding units 36-1 to 36-$k$ decodes the output signals from the derate matching units 35-1 to 35-$k$.

For the data signals after decoding, the CBCRC determination units 37-1 to 37-$k$ perform error determination using CRC for each CB, and if an error exists, the CBCRC determination units 37-1 to 37-$k$ outputs a signal to indicate the existence of an error in this CB. If there is no error, the CBCRC determination units 37-1 to 37-$k$ output a signal indicating no error and the data signals after decoding.

For the output from the CBCRC determination units 37-1 to 37-$k$, the TBCRC determination units 38-1 to 38-$k$ perform error determination using CRC added to the TB for each TB, and if an error exists, the TBCRC determination units 38-1 to 38-$k$ outputs a signal to indicate existence of an error. If there is no error, the TBCRC determination units 38-1 to 38-$k$ output a signal to indicate no error and the data signals after decoding.

The control signal receiver 40 decodes the control signal after demodulation, and stores the scheduling information included in the control signal after decoding to the scheduling information storage unit 42.

Similarly to the base station 10, the retransmission granularity decision table storage unit 41 stores the retransmission granularity decision table for determining the retransmission granularity. Details of the retransmission granularity decision table will be described later.

Similarly to the scheduling information held by the base station 10, the scheduling information storage unit 42 stores such information as the assignment of PUSCH, MCS, a number of assigned resource blocks (hereafter RBs), and spatial multiplicity for MIMO transmission.

Similarly to the base station 10, the retransmission granularity controller 43 determines granularity for retransmission control based on the retransmission granularity decision table, maximum number of bits in the modulation schemes, or the like, stored in the retransmission granularity decision table storage unit 41. Based on the decided granularity, the retransmission granularity controller 43 outputs grouping information to indicate the correspondence of a code block and a group this code block belongs to, to the ACK/NACK information generation unit 44. The maximum number of bits in the modulation schemes may be stored in the retransmission granularity controller 43 or may be stored in the retransmission granularity decision table storage unit 41. Details on the granularity decision will be described later.

Based on the grouping information, the ACK/NACK information generation unit 44 generates ACK or NACK information in group units. For example, the ACK/NACK information generation unit 44 generates NACK information for this group if at least one CB included in the group has an error, or generates ACK information if no error exists in all the CBs included in the group.

The ACK/NACK information modulation unit 45 modulates the ACK information and the NACK information which is output from the ACK/NACK information generation unit 44.

For the ACK information and the NACK information after modulation, the radio processing units 46-1 to 46-$j$ performs such processing as sub-carrier mapping, and converts the result into radio signal. The radio signal after conversion is transmitted to the base station 10 via the transmitting antennas 47-1 to 47-$j$. The radio processing units 46-1 to 46-$j$ and the transmitting antennas 47-1 to 47-$j$ are used if the mobile station 30 performs MIMO transmission in the uplink, and uses the radio processing unit 46-1 and the transmitting antenna 47-1, for example, if the mobile station 30 does not perform MIMO transmission.

Figure 4:
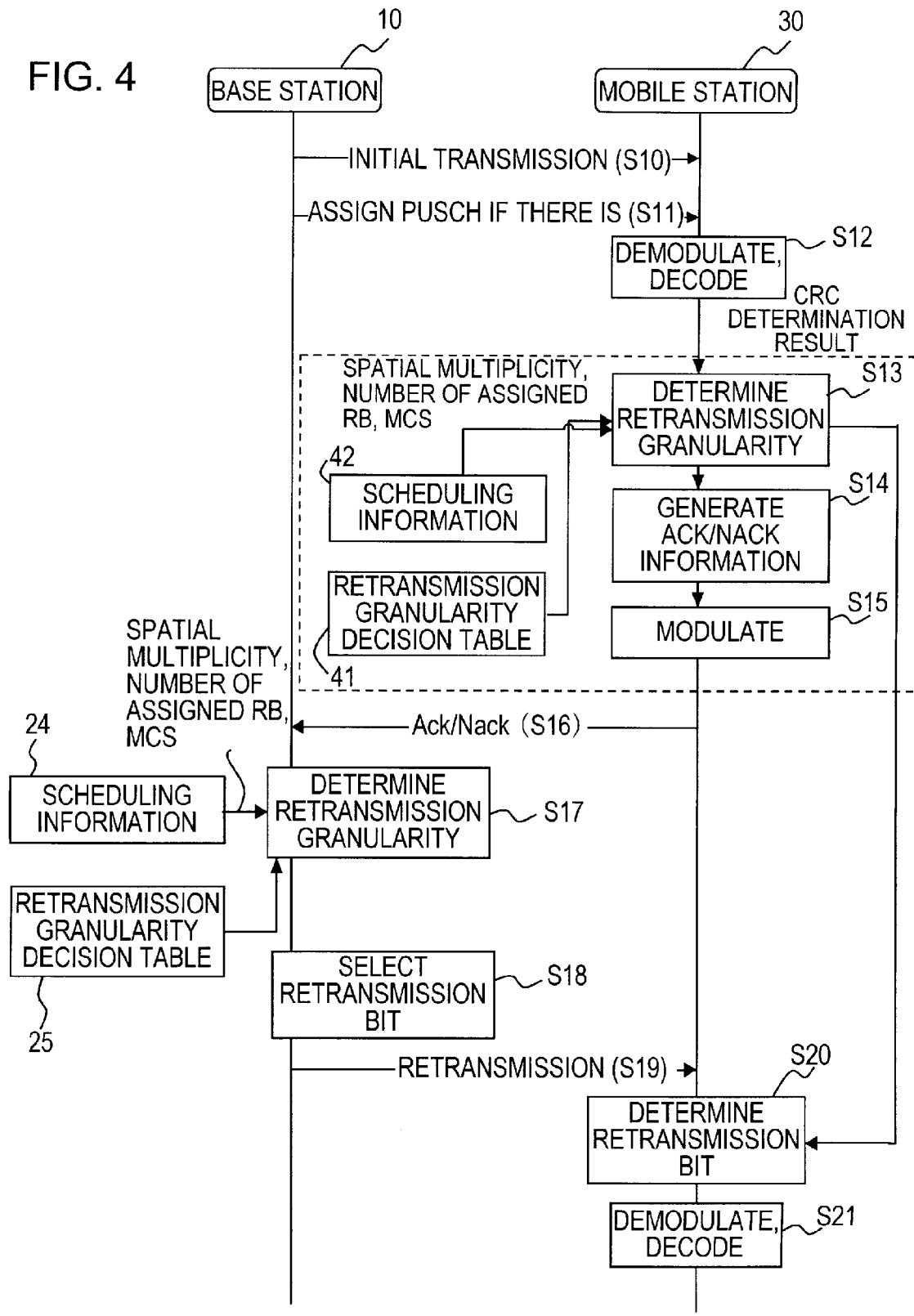
FIG. 4 is a flow chart depicting an operation example.

Operation will be described next. FIG. 4 is a flow chart depicting an operation information, and FIG. 5A to FIG. 5D illustrate an example of grouping.

First the base station 10 transmits data signal and control signal to the mobile station 30 for the first time (S10). The data signal is transmitted to the mobile station 30 from the TBCRC adding units 11-1 to 11-$n$ via the CB division CRC adding units 12-1 to 12-$n$, and the control signal is transmitted to the mobile station 30 from the control signal generation unit 20 via the modulation unit 16 respectively.

If PUSCH for data signal transmission is assigned to the mobile station 30, the base station 10 includes the information on the assignment in the control signal, and transmits this information (S11).

Then the mobile station 30 demodulates and decodes the data signal and the control signal (S12). For example, the demodulation unit 33 of the mobile station 30 demodulates the data signal and control signal, and the channel decoding unit 36-1 decodes the data signal, and the control signal receiver 40 decodes the control signal respectively.

Then the retransmission granularity controller 43 of the mobile station 30 determines the retransmission granularity (S13). There are two cases in determining the retransmission granularity: a case when PUSCH is assigned to the mobile station 30 at a timing of feeding back ACK information and NACK information; and a case when PUSCH is not assigned at this timing.

If PUSCH is assigned, the mobile station 30 multiplexes each information on ACK and NACK on the PUSCH for data signal transmission, and transmits the data. If PUSCH is not assigned, on the other hand, the mobile station 30 multiplexes each information on ACK and NACK on the PUSCCH for control signal transmission, and transmits the data. The base station 10 determines whether PUSCH is assigned or not by scheduling. If PUSCH is assigned, the mobile station 30 can transmit more ACK and NACK information compared with a case when PUSCH is not assigned.

Whether PUSCH is assigned or not is transmitted from the base station 10 as control signal, and stored in the scheduling information storage unit 42, hence the retransmission granularity controller 43 can determine whether PUSCH is assigned or not using the scheduling information stored in the scheduling information storage unit 42.

The retransmission granularity controller 43 of the mobile station 30 switches grouping of the data signal according to a type of a channel, and transmits ACK and NACK in group units. Details of this will be described later.

If PUSCH is not assigned, the retransmission granularity controller 43 forms groups in TB so that the number of groups is the same as the maximum number of bits in the modulation scheme in the modulation scheme that PUCCH supports (S13). The number of bits in the modulation scheme is a number of bits that can be transmitted in the modulation scheme, and is "4" in the case of "16 QAM", for example, and "6" in the case of "64 QAM". If the PUCCH supports "BPSK" and "QPSK", for example, the maximum number of bits in the modulation schemes is "2". If the PUCCH supports "BPSK", "QPSK" and "16 QAM", the maximum number of bits in the modulation schemes is "4".

Figure 5:
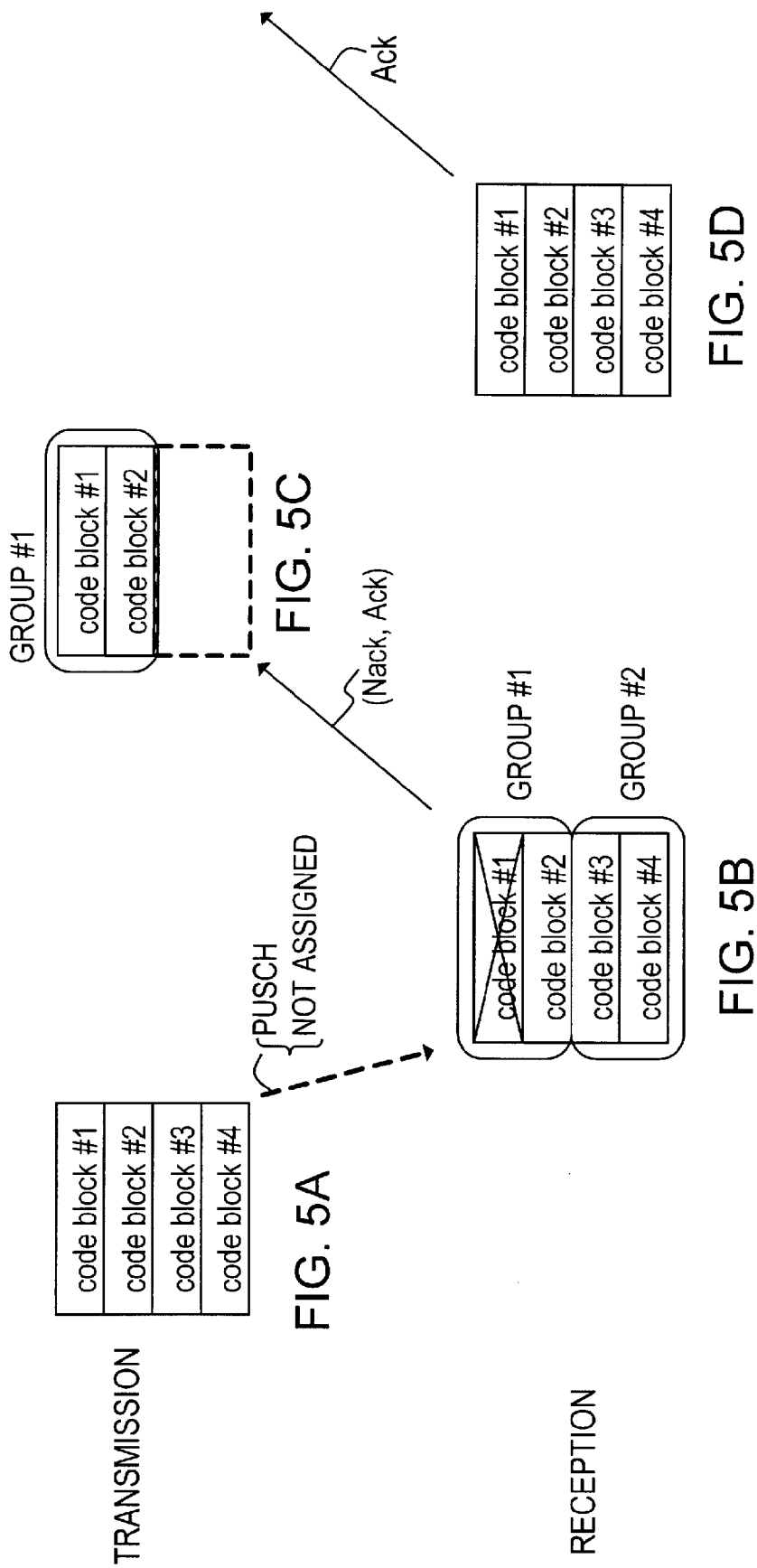
FIG. 5A to FIG. 5D illustrate an example of grouping.

The example illustrated in FIG. 5A is a case when the base station 10 does not assign PUSCH, and transmits data signal using four code blocks (code block #1 to code block #4) as one TB. If the maximum number of bits in the modulation schemes is "2" (for example, modulation scheme is "QPSK"), the retransmission granularity controller 43 divides one TB into "2" groups. The retransmission granularity controller 43 constitutes a group #1 by the code block #1 and the code block #2, and constitutes the group #2 by the code block #3 and the code block #4. This grouping is one example, and any combination is acceptable only if two groups are formed in the TB. The maximum number of bits in the modulation schemes may be stored in the retransmission granularity decision table storage unit 41, or in the retransmission granularity controller 26, for example.

Referring back to FIG. 4, the retransmission granularity controller 43 outputs the grouping information, to indicate correspondence of a code block and a group that this code block belongs to, to the ACK/NACK information generation unit 44. The ACK/NACK information generation unit 44 generates information of ACK or NACK in group units (S14).

In the example in FIG. 5B, an error exists in the code block #1, hence ACK/NACK information generation unit 44 generates the NACK information for the group #1, and generates the ACK information for the group #2, and outputs (NACK, ACK) to the group #2.

The mobile station 30 modulates each information of ACK and NACK (S15), multiplexes this information to PUCCH, and transmits it to the base station 10 (S16). In the case of FIG. 5B, the mobile station 30 transmits (NACK, ACK) to the base station 10 (FIG. 5C). The ACK/NACK information modulation unit 45 modulates the ACK or NACK by the modulation scheme corresponding to the maximum number of bits in the modulation schemes.

When each information of the ACK and NACK is received, the base station 10 demodulates each information of the ACK and NACK by the ACK/NACK information demodulation unit 23, and outputs the demodulated information to the retransmission granularity controller 26. The retransmission granularity controller 26 discerns (or decides) the retransmission granularity, that is, performs grouping (S17).

The grouping is the same as the case of the mobile station 30, and based on the maximum number of bits in the modulation schemes for the mobile station 30, the retransmission granularity controller 26 divides TB into a same number of groups as the maximum number of bits in the modulation schemes. The retransmission granularity controller 26 specifies a group for which NACK information was fed back, and requests the retransmission bit selection unit 15 to retransmit the transmission bits included in this group. The retransmission bit selection unit 15 selects the retransmission bits based on this request, and outputs the retransmission bits to the modulation unit 16 (S18). The retransmission data signal including the retransmission bits are transmitted to the mobile station 30 (S19).

In the case of FIG. 5C, the transmission granularity controller 26 specifies the group #1 corresponding to the NACK, and outputs a specific information to the retransmission bit selection unit 15 so that the code blocks included in the group #1 (code block #1 and code block #2) are selected. The base station 10 retransmits the data signal included in the two code blocks in the group #1 to the mobile station 30.

Then based on the grouping information used for the retransmission granularity determination, the mobile station 30 determines ACK or NACK for the retransmitted data signal (S20, S21). In the case of FIG. 5D, no error exists in the CBs included in the retransmitted group #1, therefore the mobile station 30 transmits (ACK) to the base station 10.

Now an example of determining retransmission granularity when PUSCH is assigned to the mobile station 30 is described. FIG. 6A to FIG. 6D illustrate an example of grouping.

Figure 6:
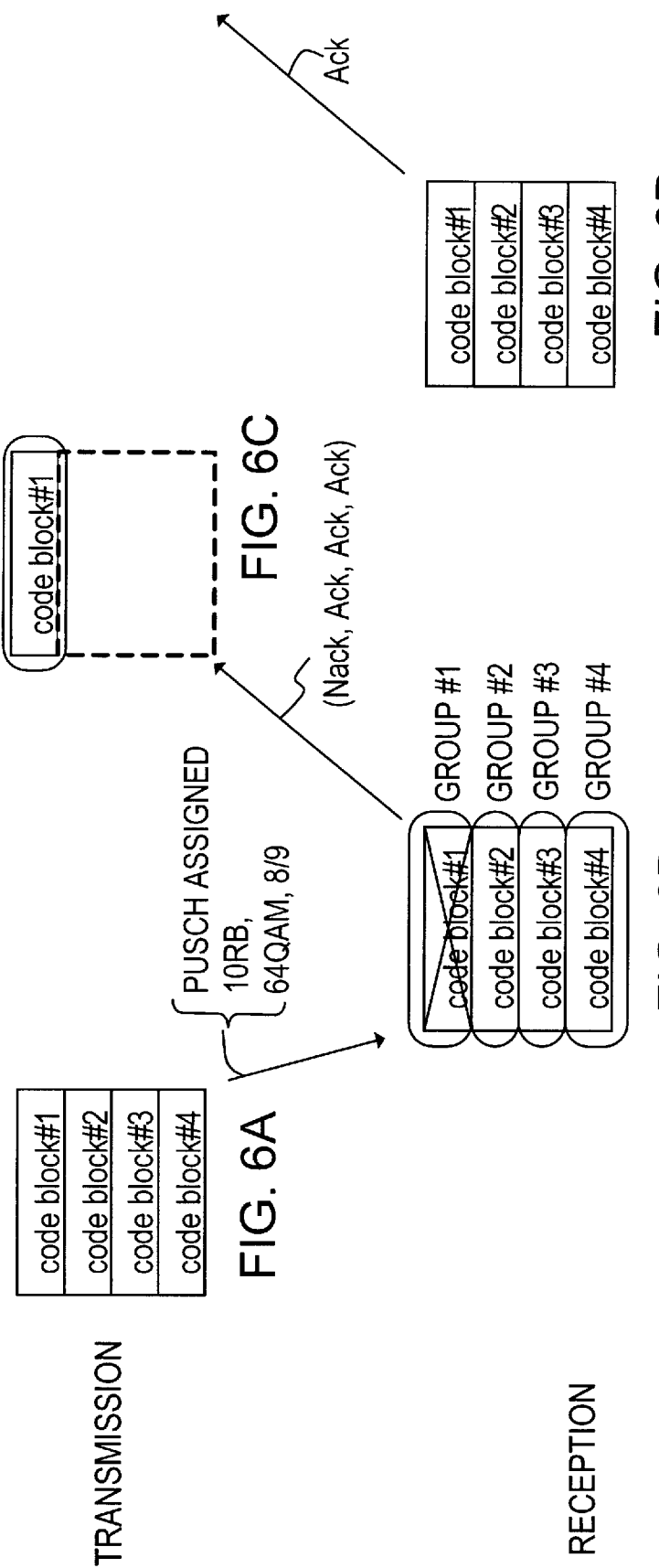
FIG. 6A to FIG. 6D illustrate another example of grouping.

The base station 10 generates control signal including PUSCH assignment information for the mobile station 30, MCS and a number of assignment resource blocks (hereafter RBs) in the up direction, and transmits the control signal to the mobile station 30 (S11). In the case of FIG. 6A, a number of assigned RBs is "10" and the MCS is that the modulation scheme is "64 QAM" and the encoding rate is "8/9" encoding rate.

Then the mobile station 30 demodulates and decodes the data signal and control signal (S12), and determines the retransmission granularity, that is, performs grouping (S13). Based on the MCS and the number of scheduling assigned RBs, the retransmission granularity controller 43 accesses the retransmission granularity decision table 41, and reads a corresponding number of groups to be formed.

FIG. 7 illustrates an example of a retransmission granularity decision table stored in the retransmission granularity decision table storage unit 41. The retransmission granularity decision table stores each information of MCS, a number of RBs, and a corresponding number of groups to be formed. In the retransmission granularity decision table, if the modulation scheme is "64 QAM" and the encoding rate is "8/9", the number of groups to be formed is higher than the case when the modulation scheme is "QPSK" and the encoding rate is "1/9". This is because the former, compared with the latter, can transmit more information, and therefore the mobile station 30 can transmit more information of ACK and NACK.

In the case of FIG. 6A, the modulation scheme is "64 QAM", the encoding rate is "8/9" and a number of RBs is "10", therefore a number of groups to be formed is "4". The retransmission granularity controller 43 divides the TB into 4 groups.

Then the ACK/NACK information generation unit 44 generates each information of ACK and NACK in group units (S14), and transmits each information to the base station 10 (S15 to S16). In the case of FIG. 6B, the ACK/NACK information generation unit 44 generates NACK information for the group #1 and ACK information for the other three groups, and multiplexes (NACK, ACK, ACK, ACK) on PUSCH, and transmits it to the base station 10.

The retransmission granularity controller 26 of the base station 10 performs grouping in the same way, and specifies the code block #1 corresponding to the NACK information (S17). The retransmission bit selection unit 15 selects retransmission bits included in this CB and outputs the retransmission bits. The base station 10 retransmits data signal corresponding to the NACK information (S18 to S19).

The ACK/NACK information generation unit 44 of the mobile station 30 generates ACK information and transmits it to the base station 10 if no error exists in the retransmitted code block #1, or transmits the NACK information to the base station 10 if an error exists (S20 to S21). In the case of FIG. 6D, no error exists, hence the mobile station 30 transmits (ACK) to the base station 10.

In the case of this example, TB is grouped in CB units, and the mobile station 30 feeds back ACK and NACK in CB units.

FIG. 8A to FIG. 8D illustrate another example of grouping. In the case of FIG. 8A to FIG. 8D, PUSCH is assigned, a number of RBs is "1", and MCS is that the modulation scheme is "QPSK" and the encoding rate is "1/9".

In this case, the retransmission granularity controller 43 of the mobile station 30 obtains a number of groups to be formed as "2" from the retransmission granularity decision table (FIG. 7), and divides TB into two groups (FIG. 8A and FIG. 8B). Since an error exists in the code block #1 of the group #1, the ACK/NACK information generation unit 44 generates (NACK, ACK). This information is multiplexed on PUSCH and is transmitted to the base station 10.

The base station 10 retransmits the data signal included in the retransmission target group #1, and the mobile station 30 feeds back ACK or NACK on the group #1 for the retransmitted data signal (FIG. 8C and FIG. 8D).

In this way, the base station 30 according to the second embodiment switches a number of groups to be formed in TB, that is, the granularity of the retransmission control, according to the type of the assigned channel. Since the mobile station 30 can transmit an optimum number of ACKs and NACKs according to the type of the assigned channel to the base station 10, the frequency utilization efficiency can be improved compared with the case of transmitting ACKs and NACKs always in TB units or in CB units.

If PUSCH is assigned, the mobile station 30 switches to an optimum number of ACKs and NACKs according to the type of MCS, and transmits the ACKs and NACKs. Therefore according to the second embodiment, the frequency utilization efficiency can be improved compared with the case of transmitting ACKs and NACKs in TB units or in CB units.

Furthermore, if PUSCH is assigned, the mobile station 30 switches a number of ACKs and NACKs to an optimum number according to a number of RBs and transmits the ACKs and NACKs. Therefore according to the second embodiment, the frequency utilization efficiency can be improved compared with the case of the mobile station 30 always transmitting ACKs and NACKs in TB units or in CB units, since an optimum amount of ACKs/NACKs matching with the resource amount can be transmitted.

Third Embodiment

A third embodiment will now be described. The third embodiment is a case when MIMO spatial multiplexed transmission is applied in the uplink. This case will also be described in two cases, in the same manner as in the second embodiment: a case when PUSCH is assigned at a feedback timing of ACK and NACK; and a case when PUSCH is not assigned at this timing.

A case when PUSCH is not assigned will be described first. FIG. 9A to FIG. 9D illustrate an example of grouping in such a case. In the same manner as in the second embodiment, an example when the maximum number of bits in the modulation schemes is "2" upon transmission via PUCCH (for example, "QPSK") will be described.

The base station 10 transmits data signal to the mobile station 30 (S10). The base station 10 includes the spatial multiplexity of the uplink in the control signal, and transmits this control signal. The information on the spatial multiplexity in the uplink direction is stored in the scheduling information storage unit 24, and the control signal generation unit 20 reads this information to generate the control signal.

The retransmission granularity controller 43 determines the retransmission granularity, that is, determines grouping (S13). In the third embodiment, ACKs and NACKs can be transmitted from a plurality of transmitting antennas 47-1 to 47-j by the MIMO multiplexed transmission, hence the retransmission granularity controller 43 divides TB into a number of groups, which is equal to (a maximum number of bits in modulation schemes×spatial multiplicity). In the case of FIG. 9A, the maximum number of bits in the modulation schemes is "2" and the spatial multiplexity is "2", therefore TB is divided into "4" groups.

Then the ACK/NACK information generation unit 44 generates (NACK, ACK) which corresponds to the groups #1 and #2, and (ACK, ACK) which corresponds to the groups #3 and #4. The former is transmitted from the transmitting antenna 47-1 and the latter is transmitted from the transmitting antenna 47-2 (S16, FIG. 9B).

The retransmission granularity controller 26 of the base station 10 selects data signal included in the group #1 corresponding to NACK, and the retransmission bit selection unit 15 transmits the retransmission bits included in the group #1 to the mobile station 30 as the retransmission data signal (S17 to S19, FIG. 9C).

Since no error exists in the retransmission data signal, the ACK/NACK information generation unit 44 of the mobile station 30 generates (ACK) for the group #1, and feeds it back to the base station 10 (FIG. 9D).

In the case of this example, grouping is performed in code block units, and ACKs and NACKs are fed back in code block units.

Now a case when PUSCH is assigned will be described. FIG. 10A to FIG. 10D illustrate an example of grouping.

The base station 10 transmits data signal (S10). The base station 10 also assigns PUSCH, and generates control signal including each information where PUSCH is assigned, a number of RBs is "5", spatial multiplicity is "2", the modulation scheme is "16 QAM" and the encoding rate is "2/3" for a certain uplink, and the modulation scheme is "QPSK" and the encoding rate is "1/6" for the other uplink, and transmits the control signal (S11).

From the retransmission granularity decision table, the retransmission granularity controller 43 of the mobile station 30 reads a number of groups to be formed as "3", which is linked with "16QAM", and a number of groups to be formed as "2", which is linked with "QPSK". Then the retransmission granularity decision table decides "5", that is the total number of groups to be formed in TB, as the retransmission granularity (S13). However, a number of CBs in one TB is "4", as illustrated in FIG. 10B, hence the retransmission granularity controller 43 divides TB into "4" groups.

The ACK/NACK information generation unit 44 generates (NACK, ACK, ACK) for the groups #1 to #3, and (ACK) for the group #4. (NACK, ACK, ACK) is transmitted from the transmitting antenna 47-1, and (ACK) is transmitted from the transmitting antenna 47-2 (S14 to S16, FIG. 10B).

The retransmission granularity controller 26 of the base station 10 specifies the retransmission bits included in the CBs of the group #1 corresponding to NACK (FIG. 10C), the retransmission bit selection unit 15 outputs the specified retransmission bits to the modulation unit 16, and the retransmission data signal is transmitted to the mobile station 30 (S17 to S19).

If no error exists in the retransmission bits included in CBs of the group #1, the ACK/NACK information generation unit 44 of the mobile station 30 generates ACK, and transmits it to the base station 10 (FIG. 10D).

In the third embodiment, the mobile station 30 switches to a number of ACKs and NACKs according to the spatial multiplicity, and feeds back the ACKs and NACKs, so compared with a case of feeding back ACKs and NACKs always in TB units or in CB units, frequency utilization efficiency can be improved.

In the description of the third embodiment, an example of the spatial multiplicity in the uplink is "2", but the present embodiment can also be applied even if the spatial multiplicity is "3" or greater.

Fourth Embodiment

A fourth embodiment will now be described. The fourth embodiment is a case when the down link is MIMO transmission, and a plurality of TBs are transmitted. A case when PUSCH is assigned at a timing when the mobile station 30 feeds back each information of ACK and NACK, and a case when PUSCH is not assigned at this timing will be described.

A case when PUSCH is not assigned will be described first. It is assumed that the maximum number of bits in the modulation schemes when the mobile station 30 transmits using PUCCH is "2", The base station 10 transmits data signal in four TBs (code word #1 to code word #4) using four transmitting antennas 18-1 to 18-4 by MIMO transmission (spatial multiplicity "4") (S10, FIG. 11A).

Then the retransmission granularity controller 43 of the mobile station 30 divides the four TBs into "2" groups, which is equal to the maximum number of bits in the modulation schemes (FIG. 11B). Since an error exists in the CBs included in the group #1 and no error exists in all the CBs included in the group #2, the ACK/NACK information generation unit 44 generates (NACK, ACK). The generated (NACK, ACK) is transmitted to the base station 10 (S16).

The retransmission granularity controller 26 of the base station 10 performs grouping in the same manner (S17), and specifies the retransmission bits included in the CBs of the group #1 corresponding to the NACK (CB#1 to CB#4 of code word #1, and CB#1 to CB#4 of code word #2). The retransmission bit selection unit 15 selects the specified retransmission bits and outputs the selected retransmission bits to the modulation unit 16. The retransmission target data signal is transmitted from the base station 10 to the mobile station 30 (S19, FIG. 11C).

Since no error exists in the CBs included in the retransmitted group #1, the ACK/NACK information generation unit 44 of the mobile station 30 generates the ACK information, and transmits it to the mobile station 30 (S20 to S21, FIG. 11D).

Now a case when PUSCH is assigned will be described.

The base station 10 transmits four TBs by MIMO transmission with spatial multiplicity "4" (S10, FIG. 12A). The base station 10 transmits control signal including each information where PUSCH is assigned, number of RBs "2", MCS (the modulation scheme is "16 QAM" and the encoding rate is "1/2") to the mobile station 30 (S11).

The mobile station 30 determines a number of groups "4" from the retransmission granularity decision table based on the MCS and number of RBs, and divides the four TBs into four groups (S13, FIG. 12B). Since an error exists in the CBs included in the groups #1 and #2, and no error exists in the groups #3 and #4, the mobile station 30 generates (NACK, NACK, ACK, ACK), and feeds back [(NACK, NACK, ACK, ACK)] to the base station 10 (S16).

The base station 10 transmits the retransmission data included in the groups #1 and #2 (S19, FIG. 12C).

Since no error exists in the retransmission data included in the retransmitted groups #1 and #2, the mobile station 30 feeds back ACK to the base station 10 (FIG. 12D).

FIG. 13A to FIG. 13D illustrate an example when PUSCH is assigned, a number of RBs is "10", the modulation scheme is "64 QAM" and the encoding rate is "8/9".

In some cases, the retransmission granularity decision table has higher MCSs and more RBs than FIG. 7. FIG. 14 illustrates another example of the retransmission granularity decision table.

If the retransmission granularity division table illustrated in FIG. 14 is used, a number of groups to be formed by the mobile station 30 is "8". The mobile station 30 divides the four TBs into eight groups, as illustrated in FIG. 13B (S13, FIG. 13B). Then the mobile station 30 feeds back (NACK, ACK, NACK, NACK, ACK, ACK, ACK, ACK).

The base station 10 selects the transmission bits of the CBs included in the groups #1, #3 and #4 corresponding to NACK as the retransmission bits (S19, FIG. 13C).

Since no error exists in the CBs included in the retransmitted groups #1, #3 and #4, the mobile station 30 feeds back (ACK) (FIG. 13D).

According to the fourth embodiment, even if a plurality of TBs are received at the same time by MIMO transmission, the mobile station 30 switches a number of groups to be formed, according to a type of the assigned channel, and transmits a number of ACKs and a number of NACKs according to the group switched to. Therefore compared with a case of the mobile station 30 always transmitting ACK and NACK in TB units or in CB units, the mobile station 30 can feedback an optimum number of the ACKs and NACKs according to the type of the channel, therefore the frequency utilization efficiency can be improved.

In the fourth embodiment, even if a plurality of TBs are received at the same time by MIMO transmission, the mobile station 30 switches a number of ACKs and NACKs to transmit according to MCS when PUSCH is assigned. Therefore compared with the case of transmitting ACKs and NACKs always in TB units or in CB units, the frequency utilization efficiency can be improved, in the same manner as in the second embodiment.

Even if a plurality of TBs are received at the same time in MIMO transmission, the mobile station 30 switches to a number of ACKs and NACKs corresponding to the number of RBs, and transmits them when the PUSCH is assigned. Therefore the mobile station 30 can improve the frequency utilization efficiency in the uplink direction, in the same manner as in the second embodiment.

In the description of the fourth embodiment, the spatial multiplicity in the downlink is "4", but the present invention can be carried out with a spatial multiplicity other than "4".

Fifth Embodiment

A fifth embodiment will now be described. The fifth embodiment is an example when the downlink is in MIMO spatial multiplex transmission mode (spatial multiplicity "4"), and the uplink is also in MIMO spatial multiplex transmission mode (spatial multiplicity "2"). In the fifth embodiment as well, a case when PUSCH is assigned at a timing when the mobile station 30 feeds back ACK and NACK, and a case when PUSCH is not assigned at this timing will be described.

FIG. 15A to FIG. 15D illustrate an example of grouping when PUSCH is not assigned. It is assumed that the maximum number of bits in the modulation schemes when the mobile station 30 transmits using PUCCH is "2" (for example, QPSK), for example.

The base station 10 transmits the data signal using four TBs (code words #1 to #4) (S10, FIG. 15A).

Then the mobile station 30 demodulates and decodes the data signal (S12), and divides the four TBs into two groups, which is equal to (maximum number of bits in modulation schemes)×"2" (spatial multiplicity)=4. The mobile station 30 sequentially forms a group, such as the first TB (code word #1) as the group #1, and the second code word #2 as the group #2 (FIG. 15B). The spatial multiplicity "2" in the up direction is transmitted from the base station 10 as a control signal.

Then based on the CRC determination result, the mobile station 30 generates NACK for the groups #1 and #2, and ACK for the groups #3 and #4, and transmits (NACK, NACK) from the transmitting antenna 47-1, and (ACK, ACK) from the transmitting antenna 47-2 (S14 to S16).

Then the base station 10 selects transmission bits in the code blocks included in the groups #1 and #2 corresponding to NACK, and retransmits data signal including transmission bits (S17 to S19, FIG. 15C).

Then the mobile station 30 performs CRC determination for the retransmitted data signal, and feeds back (ACK) since no error exists (S20 to S21, FIG. 15D).

In the case of this example, the plurality of TBs are grouped in TB units, and ACK and NACK are transmitted, and data signal is retransmitted in TB units.

FIG. 16A to FIG. 16D illustrate an example of grouping in a case when PUSCH is assigned. The base station 10 transmits data signal using four TB's (S10). The base station 10 also transmits control signal including each information where the PUSCH is assigned, number of RBs is "2", spatial multiplicity in the up direction is "2", the modulation scheme is "16 QAM" and the encoding rate is "2/3" in first uplink, and the modulation scheme is "QPSK" and the encoding rate is "1/6" in second uplink (S11, FIG. 16A).

Then from the retransmission granularity decision table (FIG. 14), the mobile station 30 reads a number of groups "4" for the link of "16 QAM", and a number of groups "2" for the link of "QPSK", and divides the four TBs into six groups (S13, S16B).

Then based on the CRC determination result, the mobile station 30 generates NACK for the groups #1 to #3, and ACK for the groups #4 to #6. (NACK, NACK, NACK, ACK) is transmitted from the transmission antenna 47-1 to the link of "16 QAM", and (ACK, ACK) is transmitted from the transmission antenna 47-2 to the link of "QPSK" (S16).

Then the base station 10 retransmits the data signal in the groups #1 to #3 (S19, FIG. 16C). The mobile station 30 performs CRC determination for the data signal included in the retransmitted groups #1 to #3, and feeds back ACK since no error exists (S20 to S21).

FIG. 17A to FIG. 17D also illustrate another example of grouping when PUSCH is assigned.

In this example, a number of RBs is "5", a spatial multiplicity in the up direction is "2", MCS for first uplink is that the modulation scheme is "16 QAM" and the encoding rate is "1/2", and MCS for the other uplink is that the modulation scheme is "QPSK" and the encoding rate is "1/6".

From the retransmission granularity decision table, the mobile station 30 reads a number of groups "5" for the link of "16 QAM", and "3" for the link of "QPSK". The mobile station 30 divides four TBs into eight groups. The mobile station 30 generates NACK for the groups #1, #3 and #4, and generates ACK for the other groups. The mobile station 30 transmits (NACK, ACK, NACK, NACK, ACK) from the transmitting antenna 47-1, and transmits (ACK, ACK, ACK) from the transmitting antenna 47-2 (S13 to S16, FIG. 17B).

The base station 10 retransmits the data signal corresponding to NACK, and the mobile station 30 feeds back ACK since no error exists according to the CRC determination (S17 to S21, FIG. 17C to FIG. 17D).

According to the fifth embodiment, even if a plurality of TBs are received at the same time in MIMO transmission in downlink, the mobile station 30 switches to a number of ACKs and NACKs according to the spatial multiplicity in the uplink, and feeds them back, so compared with the case of feeding back ACKs and NACKs always in TB units or in CB units, frequency utilization efficiency can be improved. Since a number of ACKs and NACKs matching with a type of channel, type of MCS, or a number of RBs are fed back in this case, the frequency utilization efficiency can be improved, in the same manner as in the second embodiment.

In the fifth embodiment, the spatial multiplicity in the uplink and in the downlink may be other than "4" and "2" respectively.

Other Embodiments

In the description of the second to the fifth embodiments, the maximum number of bits in the modulation schemes when PUCCH is used is "2". However, a maximum number of bits in the modulation schemes other than "2" may be used in the above embodiments. It is preferable that the maximum number of bits in the modulation schemes and the modulation scheme establish a 1-to-1 relationship, such as the maximum number of bits in the modulation schemes "2" corresponds to "QPSK" modulation scheme, and "4" corresponds to "16 QAM" modulation scheme. Therefore in the description in the second to fifth embodiments, a number of groups according to the maximum number of bits in the modulation schemes are formed, but it can be said that a number of groups according to the modulation scheme are formed. For example, if the modulation scheme is "QPSK", a number of groups to be formed is "2", and if the modulation scheme is "16 QAM", a number of groups to be formed is "4". If MIMO transmission is used in the up direction, for example, ((a number of groups to be formed according to modulation scheme)×(spatial multiplicity)) can be used. The mobile station 30 and the base station 10 may perform grouping using the modulation scheme less than the maximum number of bits in the modulation schemes. In this case, it is desirable that the mobile station 30 and the base station 10 determine in advance which modulation scheme (for example, the modulation scheme of which number of bits is smallest) is used.

In the second to the fourth embodiments, when the type of the channel for transmitting ACK and NACK is PUSCH, grouping is performed according to the type of MCS. However the retransmission granularity controller 43 of the mobile station 30 may perform grouping according to the type of MCS, regardless the type of the channel. For example, since MCS is transmitted as a control signal, the mobile station 30 can perform grouping according to MCS included in the control signal. In the case of "64 QAM" modulation scheme, for example, the transmission amount is higher than the case of "QPSK" modulation scheme, so a number of groups to be formed is increased so that a number of ACKs and NACKs that can be transmitted by one transmission can be increased. The retransmission granularity decision table may store a table which indicates the correspondence of a type of MCS and a number of groups to be formed, for example. Since an optimum number of ACKs and NACKs according to the type of MCS are fed back, frequency utilization efficiency can be improved compared with the case of feeding back ACKs and NACKs always in TB units or in CB units.

In the second to the fifth embodiment, grouping is performed according to a number of RBs when the type of the channel is PUSCH. In this case as well, grouping may be performed according to a number of RBs regardless the type of the channel. For example, when a number of RBs is included in the control signal, a number of groups to be formed may be changed depending on whether the number of RBs is the threshold or more or lower than the threshold. In this case, the retransmission granularity decision table may store a table which indicates correspondence of a number of RBs and a number of groups to be formed. Since an optimum number of ACKs and NACKs according to a number of RBs are fed back, the frequency utilization efficiency can be improved compared with the case of feeding back ACKs and NACKs always in TB units or in CB units.

The mobile station 30 may switch a number of groups to be formed according to a combination of a type of channel, MCS, a number of RBs and spatial multiplicity.

In the first to the fifth embodiments, an open resource may be generated due to a group which is not retransmitted. An example of this is the group #2 in FIG. 5C. In this case, the base station 10 may transmit a new data packet using the open resource, or may use the open resource for a resource for other mobile stations 30.

The mobile station 30 and the base station 10 can switch the operations described in the second to the fifth embodiments appropriately. For example, if a plurality of TBs are transmitted from the base station 10, the mobile station 30 and the base station 10 execute the operation described in the fourth or fifth embodiment, and if the up direction is switched to MIMO transmission, the mobile station 30 and the base station 10 switch to the operation described in the second or the fifth embodiment.

The invention claimed is:

1. A radio communication system comprising:
a base station apparatus; and
a mobile station apparatus, wherein
the base station apparatus and the mobile apparatus perform radio communication,
the mobile station apparatus includes:
a receiver which receives a data signal transmitted from the base station apparatus;
a controller which switches a number of group units from a first number to a second number and groups the data signal by the switched number of group units, according to one parameter or a combination of a plurality of parameters out of a type of a channel, a type of modulation scheme and encoding rate, an assigned resource amount, or a number of transmitting antennas of the mobile station apparatus, in case of transmitting an ACK signal or an NACK signal in response to the data signal; and
a transmitter which transmits the ACK signal or the NACK signal in each group unit of the data signal, and
the base station apparatus includes:
a transmitter which transmits the data signal; and
a receiver which receives the ACK signal or the NACK signal.

2. The radio communication system according to claim 1, wherein the controller groups the data signal into a maximum number or less, out of a number of bits in the modulation scheme when the ACK signal or the NACK signal is transmitted by a control channel, when the type of the channel is a control signal channel for transmitting a control signal.

3. The radio communication system according to claim 1, wherein the controller groups by a number obtained by multiplying the number of transmitting antennas by a maximum number, out of a number of bits in the modulation scheme when the ACK signal or the NACK signal is transmitted by a control signal channel, when the type of the channel is the control signal channel for transmitting a control signal and the mobile station apparatus includes a plurality of the transmitting antennas.

4. The radio communication system according to claim 1, wherein the controller switches the number of group units from the first number to the second number, according to the type of modulation scheme and encoding rate, and the assigned resource amount, when the type of the channel is a data signal channel for transmitting the data signal.

5. The radio communication system according to claim 1, wherein the controller switches the number of group units from the first number to the second number, according to the type of the modulation scheme and encoding rate, and the assigned resource amount to each of the transmitting antennas, when the type of the channel is a data signal channel for transmitting the data signal and the mobile station apparatus includes a plurality of the transmitting antennas.

6. The radio communication system according to claim 1, wherein each group unit is a unit of one of a transport block or a plurality of the transport blocks, or one of a code block or a plurality of the code blocks.

7. The radio communication system according to claim 1, wherein the transmitter of the base station apparatus retransmits the data signal included in the group unit corresponding to the NACK signal, when the NACK signal is received.

8. A mobile station apparatus for performing radio communication with a base station apparatus, the mobile station apparatus comprising:
a receiver which receives a data signal transmitted from the base station apparatus;
a controller which switches a number of group units from a first number to a second number and groups the data signal by the switched number of group units, according to one parameter or a combination of a plurality of parameters out of a type of a channel, a type of modulation scheme and encoding rate, an assigned resource amount, or a number of transmitting antennas of the mobile station apparatus, in case of transmitting an ACK signal or an NACK signal in response to the data signal; and
a transmitter which transmits the ACK signal or the NACK signal in each group unit of the data signal.

9. A base station apparatus for performing radio communication with a mobile station apparatus, the base station apparatus comprising:
a transmitter which transmits a data signal; and
a receiver which receives an ACK signal or an NACK signal transmitted by the mobile station apparatus in each group unit of the data signal which is obtained by switching a number of the group units from a first number to a second number and by grouping the data signal by the switched number of group units, according to one parameter or a combination of a plurality of parameters out of a type of a channel, a type of modulation scheme and encoding rate, an assigned resource amount, or a number of transmitting antennas of the mobile station apparatus, in case of transmitting the ACK signal or the NACK signal in response to the data signal by the mobile station apparatus.

10. A radio communication method in a radio communication system for performing radio communication between a base station apparatus and a mobile station apparatus, the method comprising:

transmitting a data signal by the base station apparatus;

receiving the data signal, switching a number of group units from a first number to a second number and grouping the data signal by the switched number of group units, according to one parameter or a combination of a plurality of parameters out of a type of a channel, a type of modulation scheme and encoding rate, an assigned resource amount, or a number of transmitting antennas of the mobile station apparatus, in case of transmitting an ACK signal or an NACK signal in response to the data signal, and transmitting the ACK signal or the NACK signal in each group unit of the data signal obtained by the grouping, by the mobile station apparatus, and receiving the ACK signal or the NACK signal by the base station apparatus.

* * * * *